(12) United States Patent
Vaid et al.

(10) Patent No.: US 12,536,504 B2
(45) Date of Patent: Jan. 27, 2026

(54) COLLABORATIVE WORKSPACES FOR BROWSERS

(71) Applicant: MICROSOFT TECHNOLOGY LICENSING, LLC, Redmond, WA (US)

(72) Inventors: Avi Ashish Vaid, New York City, NY (US); Kevin Reis DiClemente, Bellevue, WA (US); Joseph Jiwoong Oak, Bellevue, WA (US); Erik J. Snead, Woodinville, WA (US); Sean O. Lyndersay, Issaquah, WA (US); Andrew J. Ritz, Sammamish, WA (US); Christian James Colando, Seattle, WA (US); Mohamed Mansour, Kirkland, WA (US); Candice Poon, Seattle, WA (US); Patrick Evan Little, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 612 days.

(21) Appl. No.: 17/855,616

(22) Filed: Jun. 30, 2022

(65) Prior Publication Data
US 2024/0005280 A1 Jan. 4, 2024

(51) Int. Cl.
*G06Q 30/00* (2023.01)
*G06F 3/0483* (2013.01)
*G06Q 10/10* (2023.01)

(52) U.S. Cl.
CPC ......... *G06Q 10/103* (2013.01); *G06F 3/0483* (2013.01)

(58) Field of Classification Search
None
See application file for complete search history.

(56) References Cited

U.S. PATENT DOCUMENTS

| | | | |
|---|---|---|---|
| 7,734,690 B2* | 6/2010 | Moromisato | G06F 16/273 715/752 |
| 8,006,189 B2* | 8/2011 | Dachs | G11B 27/329 715/723 |

(Continued)

FOREIGN PATENT DOCUMENTS

EP    3940610 A1    1/2022

OTHER PUBLICATIONS

"The Browser Company", Retrieved From: https://web.archive.org/web/20200512170812/https://thebrowser.company/, May 12, 2020, 7 Pages.

(Continued)

*Primary Examiner* — Luis A Brown
(74) *Attorney, Agent, or Firm* — Shook, Hardy & Bacon L.L.P.

(57) ABSTRACT

System and methods for collaborative workspaces for content browsers are provided. In one embodiment, a method for a collaborative content browser comprises: obtaining a network address for a workspace management document; opening, at a browser, the workspace management document from a shared network resource based on the network address, the workspace management document recording a browser state for rendering a collaborative browser workspace in the browser; executing a browser process to generate a workspace shell for the workspace by rendering structural features of the workspace shell based on the browser state, the structural features including an user interface with a browser tab; synchronizing project resource data from the browser state to render network content from a project resource in the browser tab; and communicating an update to the browser state based on a change applied at the browser to the structural features or the project resources.

12 Claims, 11 Drawing Sheets

(56) References Cited

U.S. PATENT DOCUMENTS

| | | | | |
|---|---|---|---|---|
| 8,028,237 | B2* | 9/2011 | Schmitt | G06F 3/00 |
| | | | | 715/744 |
| 9,348,802 | B2* | 5/2016 | Massand | G06F 16/00 |
| 10,382,547 | B2* | 8/2019 | Berger | G06Q 10/101 |
| 11,405,433 | B1* | 8/2022 | Vaid | G06F 16/954 |
| 12,373,756 | B2* | 7/2025 | Brevoort | G06F 3/0482 |
| 2009/0125359 | A1* | 5/2009 | Knapic | G06Q 10/06 |
| | | | | 709/204 |
| 2009/0138808 | A1* | 5/2009 | Moromisato | G06Q 10/10 |
| | | | | 715/758 |
| 2012/0030288 | A1* | 2/2012 | Burckart | H04L 12/1822 |
| | | | | 709/205 |
| 2012/0096389 | A1 | 4/2012 | Flam et al. | |
| 2014/0258884 | A1* | 9/2014 | Bank | H04L 65/403 |
| | | | | 715/753 |
| 2016/0034435 | A1* | 2/2016 | Patidar | G06F 40/166 |
| | | | | 715/255 |
| 2017/0315974 | A1* | 11/2017 | Kong | G06F 40/166 |
| 2017/0316367 | A1* | 11/2017 | Candito | G06Q 10/063114 |
| 2018/0191832 | A1* | 7/2018 | Gero | H04L 67/1042 |
| 2020/0184013 | A1* | 6/2020 | Ilic | G06F 40/258 |
| 2022/0222426 | A1* | 7/2022 | Zionpour | G06T 13/00 |
| 2023/0214780 | A1* | 7/2023 | Fong | G06F 16/176 |
| | | | | 705/7.18 |
| 2023/0246924 | A1* | 8/2023 | Paul | G06F 3/0482 |
| | | | | 715/753 |
| 2023/0368105 | A1* | 11/2023 | Brevoort | G06Q 10/103 |
| 2023/0394440 | A1* | 12/2023 | Marshall | G06F 16/93 |

OTHER PUBLICATIONS

"The task manager built for the browser", Retrieved From: https://workona.com/tasks/tour/, Jul. 7, 2021, 6 Pages.

"The world's best tab manager", Retrieved From: https://web.archive.org/web/20210208232445/https://workona.com/tab-manager/, Feb. 8, 2021, 8 Pages.

"Workona", Retrieved From: https://workona.com/help/collaborate/, Jul. 7, 2021, 8 Pages.

"Workspace Templates", Retrieved From: https://web.archive.org/web/20200917064434/https:/workona.com/templates/, Sep. 17, 2020, 10 Pages.

Fogg, et al., "Workonav", Retrieved From: https://web.archive.org/web/20210702182400/https://workona.com/, Jul. 2, 2021, 7 Pages.

Hutchinson, A., "Google Adds New Option to Group and Color-Code Tabs in Chrome," SocialMediaToday, May 13, 2020, 4 pages.

"International Search Report and Written Opinion issued in PCT Application No. PCT/US23/022621", Mailed Date: Aug. 4, 2023, 15 Pages.

* cited by examiner

COLLABORATIVE WORKSPACES FOR BROWSERS

BACKGROUND

Current internet browser technologies are used by individuals for a multitude of different tasks. For example, internet resources for activities, such as online shopping, entertainment, banking, research, scheduling meetings, appointments, and events, and creating and/or sharing content, are amongst the many online tasks that can be performed through an internet browser. Internet browsers typically provide a way for a user to save interesting or frequently used links to websites as bookmarks that can be displayed on a bookmarks bar and/or organized into folders. Some internet browsers provide a way for a user to group related browser tabs into browser groups or collections.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein enables content browsers to support multi-user collaborations. The technology described herein provides a collaborative browser that implements contextualized collaborative browser workspaces. With the embodiments disclosed herein, a collaborative content browser provides a user device with the ability to create one or more separate collaborative browser workspaces, to invite users of other user devices to join collaborative browser workspaces, and to synchronize collaborative browser workspaces between different user devices. Each collaborative browser workspace is rendered in a workspace shell and allows members of that collaborative browser workspace to curate network resources together in a collaborative manner. The workspace shell may display a user interface that comprises a tab strip from which the user may navigate between browser tabs. In some embodiments, the tab strip or other feature of the user interface may be presented using a color, graphic, text, or other feature that is specifically associated with a collaborative browser workspace to assist a user in quickly identifying which collaborative browser workspace is currently active (e.g., which collaborative browser workspace the displayed set of browser tabs belongs to). In some embodiments, additional project resources included within a collaborative browser workspace may be tools used by members such as, but not limited to, instant messaging applications, chat channels, and voice and/or video tools (such as MICROSOFT SKYPE or MICROSOFT TEAMS, for example).

In some embodiments, the structural features of each collaborative browser workspace are stored to, and synchronized with, a cloud hosted workspace management document that records a browser state that may be used to render a collaborative browser workspace in a browser. For example, in some embodiments, structural features, such as a workspace name, color, the number of browser tabs, and browser tab names, are maintained by the browser state of the workspace management document. By maintaining the workspace management document as a cloud-hosted document on a network server, improvements to the functionality of the computing environment are realized.

In some embodiments, collaborative navigation within a collaborative browser workspace is implemented. Using collaborative navigation, in response to one workspace member navigating their browser tab to a network resource (e.g., by entering a uniform resource locator (URL) or clicking on a displayed hyperlink), browser navigation instructions are communicated, via the workspace management document, to collaborative content browsers of one or more other workspace members who are actively present in the same browser tab of the collaborative browser workspace. From the perspective of the workspace members, the result is a shared browsing experience that may help workspace members more efficiently utilize network content (and therefore lead to more efficient utilization of processing resources and network bandwidth), and reduce duplication of efforts caused by multiple users all attempting to independently locate the same resource.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
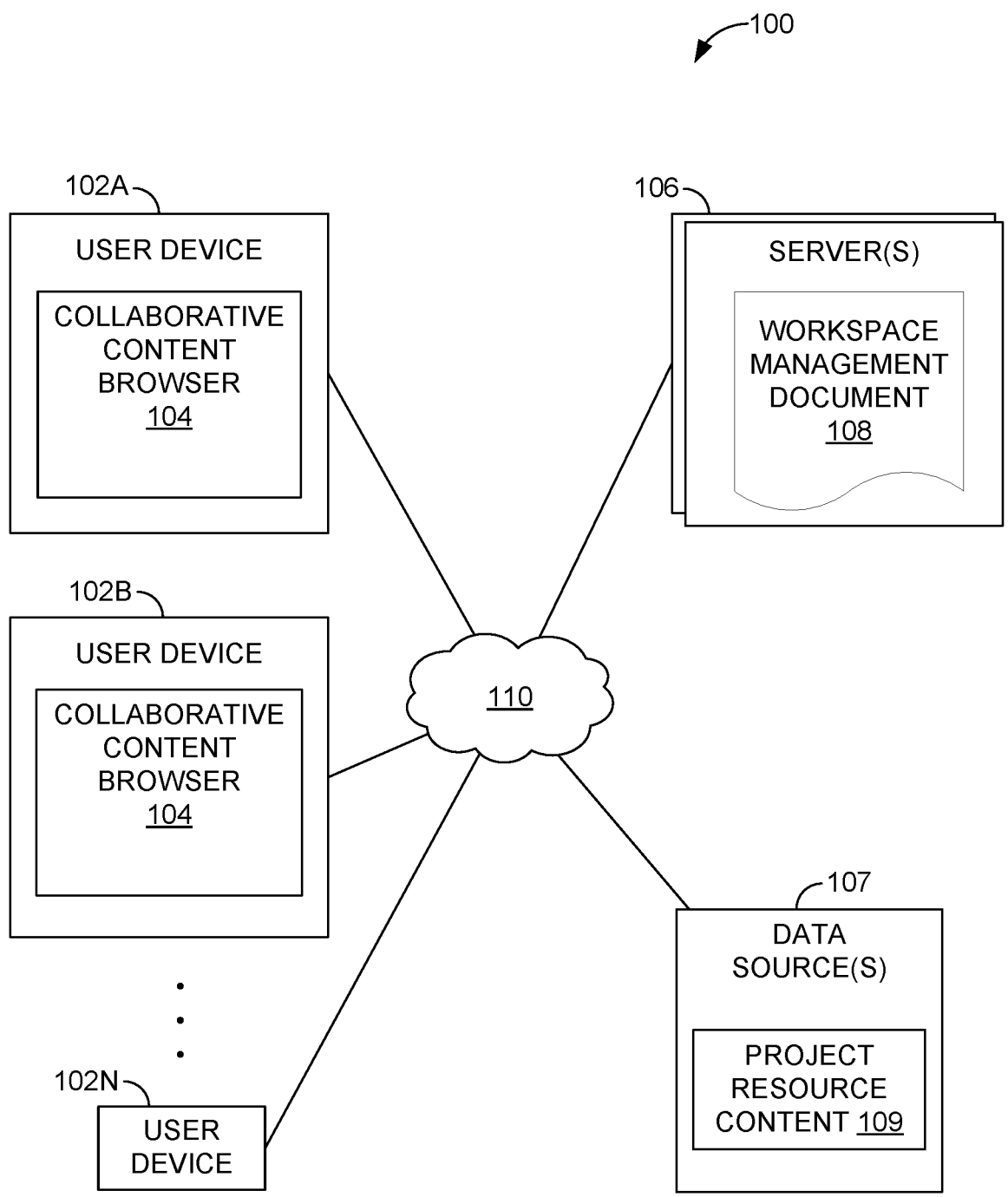
FIG. 1 is a block diagram of an example operating environment suitable for implementations of the present disclosure.

The various technologies described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

One or more of the embodiments presented herein address, among other things, the problem of computer systems and content browsers that are not designed to fully support multi-user collaborations. More specifically, the technology described herein introduces systems and methods for a collaborative browser that implements contextualized collaborative browser workspaces. As will be discussed in detail below, these workspaces facilitate collaboration between team members but also realize improvements to the functionality of the implementing computer systems with respect to the efficient use of computing resources.

A content browser (sometimes also referred to as an Internet browser, network browser, or a web browser) is a user application program that provides a visual interface to search for, display, and receive user interactions with, content hosted by a network server over a network connection. Content that may be accessed through a content browser includes, but is not limited to, web pages implemented via a markup language (such as Hyper Text Markup Language, HTML, for example), text documents, word processing, spreadsheet, and presentation documents, pdf documents, images and graphic files, photographs, video streams and audio streams. Content may further include web applications that comprise software applets executed within the environment of the content browser and/or cloud computing based software and services. A content browser may be directed to network resources that host such content by a URL that can be entered into the content browser by the user, or presented by a webpage via a hyperlink that the user selects.

There are problems that arise when content browsers are used for tasks related to projects involving collaboration between multiple users. While some online tasks performed through content browsers can involve collaborations between different people, the experience of using the browser itself remains focused on the individual user. For example, while each member of the team can organize project related links into browser groups or bookmark folders, their respective browsers can still be cluttered with links, folders, and groups related to other projects or websites used for personal business. Moreover, to share links to interesting or relevant content with other team members, a user must manually send the link (e.g., via email) to the other members of the teams, who would then manually save the link into a folder or group in their browser depending on how they have organized their respective browser. Further, current content browser technologies do not provide a way for team members to discover what content other team members are currently engaging with, without having to actively reach-out and communicate with each of the other team members to find out. Each of these issues can contribute to extraneous efforts by team members in order to coordinate with each other to accomplish tasks using their respective content browsers, resulting in the inefficient utilization of computer processing resources, bandwidth and data storage, in order to collaborate as a team.

With the embodiments disclosed herein, the collaborative content browser provides a user device with the ability to create one or more collaborative browser workspaces, to invite users of other user devices to join the collaborative browser workspace, and to synchronize collaborative browser workspaces between different user devices. Each collaborative browser workspace is rendered in a workspace shell and allows members of that collaborative browser workspace to manage, find, and use network resources together in a collaborative manner. In one aspect, the collaborative browser workspace is structured so that workspace members (e.g., users belonging to the workspace) may organize network content, bookmarks, search histories, and other information relevant to a project (collectively referred to herein as "project resources") within a collaborative browser workspace dedicated to that project. Project resources relevant to different projects can be separated into different collaborative browser workspaces, and maintained separately from content obtained from general (e.g., non-project) browsing activities.

As a member of a collaborative browser workspace engages in browsing activities within the workspace, their browsing history and URL bookmarks are saved within that collaborative browser workspace. In some embodiments, the user's browsing history may be saved in context with the workspace. That is, when browsing history is displayed (e.g., in a browser history tab or window), the history may be automatically filtered to list items related to the present workspace (e.g., websites previously viewed while within the workspace) and hide items not related to the present workspace. Within the workspace shell of each collaborative browser workspace, the user interface includes one or more browser tabs that allow workspace members to create instances of different project resources that are open within the workspace at the same time, with each open project resource appearing in a browser tab, and with browser tabs organized within a tab strip. A browser tab is a structural feature of the workspace shell within which a browser window is presented that permits a user to navigate to, display, and interact with a network resource. A workspace shell may comprise a single browser tab, or multiple browser tabs. A workspace shell that comprises multiple browser tabs permits a user to navigate to content from multiple network resources (e.g., web pages) at the same time, with each network resource presented in a respective browser tab. For example, one browser tab may provide access to an online team notebook, another browser tab to a project wiki page, another browser tab to relevant online research resources, and still other browser tabs to other project resources.

The workspace shell may display a tab strip from which the user may navigate between browser tabs. In some embodiments, the tab strip or other feature of the user interface may be presented using a color, graphic, text, or other feature that is specifically associated with a collaborative browser workspace to assist a user in quickly identifying which collaborative browser workspace is currently active (e.g., which collaborative browser workspace the current set of one or more browser tabs belongs to). In some embodiments, additional project resources included within a collaborative browser workspace may be collaborative tools used by members such as, but not limited to, instant messaging applications, chat channels, and voice and/or video tools (such as MICROSOFT SKYPE or MICROSOFT TEAMS, for example).

In some embodiments, the structural features of each collaborative browser workspace are stored to, and synchronized with, a cloud hosted workspace management document. For example, in some embodiments, structural features, such as a workspace name, color, number of tabs and tab names, are maintained by the workspace management document. In some embodiments, the workspace management document is hosted on a network resource that is accessed via its URL. When the URL is entered into the collaborative content browser, the collaborative content browser locates the workspace management document based on the URL and renders the collaborative browser workspace based on the structural features defined in the workspace management document.

By maintaining the workspace management document as a cloud-hosted document on a network server, improvements to the functionality of the computing environment are realized. As an example, with respect to scalability, the information used for rendering a collaborative browser workspace is maintained as a centralized document hosted on a shared network resource (e.g., a server). The server storing resources to support synchronizing the workspace to users does not need to substantially scale as the number of workspace members increase. Aggregate network storage increases needed to support a growing number of workspace members are therefore minimal. Also, as discussed below, the shared workspace functionality is created without substantially increasing complexity at the server because the use of dedicated server-side programing is avoided. Moreover, the user devices rendering each member's respective collaborative browser workspace do not need to store or maintain data locally regarding workspace membership and/or other user information in order to synchronize a uniform workspace structure across user devices. Instead, each collaborative content browser need only report local updates of workspace structure and usage to the workspace management document, and monitor for changes to the workspace management document to receive updates made by other members.

In other aspects, the cloud hosted workspace management document facilitates real-time member collaboration and shared project resource browsing experiences. For example, in some embodiments, the user interface for the collaborative browser workspace includes one or more member presence indicators that show when other workspace members are present and/or actively engaged with one or more project resources within the collaborative browser workspace. In some embodiments, the member presence indicators may more specifically show which specific project resource another member is engaged with, and whether a present member is currently interacting with a project resource or just observing another member interacting with the project resource. The member presence indicators may be synchronized across the member user devices via the workspace management document. For example, in some embodiments, a user's collaborative content browser reports local user activity (e.g., whether a member has the collaborative browser workspace open within their collaborative content browser, and if so, what tab is currently open and/or what project resource they are engaged with) to the workspace management document, which maintains this local user activity data at least for currently online workspace members. When member presence indicator data maintained by the workspace management document is updated, such changes are observed by each collaborative content browser rendering the associated collaborative browser workspace and the local member presence indicator is updated accordingly. Synchronizing member presence indicator data via the workspace management document immediately provides real-time information that reduces computing resources consumed to coordinate project activities. For example, as opposed to one member needing to use an email application or use an instant messaging application to determine what other workspace members are actively working on, the member presence indicator readily conveys that information.

With respect to shared project resource browsing experiences, in some embodiments, the collaborative content browser implements collaborative navigation. With collaborative navigation, when one member navigates their browser tab to a network resource (e.g., by entering a URL or clicking on a displayed hyperlink), browser navigation instructions are communicated, via the workspace management document, to the collaborative content browser of other workspace members who are actively present in the same browser tab of the collaborative browser workspace. In response, their browser tab will navigate to a URL based on the browser navigation instructions. It should be noted that while the browser tab for each respective member is navigating to the same network resource, each collaborative content browser is independently served content from the network resource. For example, if the first member navigates to a web page of a streaming video server, browser navigation instructions are communicated to the workspace management document. The collective content browsers currently rendering that workspace management document and with members present in the same browser tab as the first member will also navigate to the page of the streaming video server and each receive a stream of the same streaming video content from the streaming video server. In some embodiments, the browser navigation instructions communicated to the workspace management document may comprise the same URL used by the member that first navigated to the network content. In other embodiments, the browser navigation instructions instead may comprise an abstraction or other representation that will direct the workspace browser of the other workspace members to the same content.

Having briefly described an overview of aspects of the technology described herein, an exemplary operating environment in which aspects of the technology described herein may be implemented is described below in order to provide a general context for various aspects.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and/or groupings of functions) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by at least one processor executing instructions stored in memory.

Among other components not shown, example operating environment 100 includes a number of user devices, such as user devices 102*a* and 102*b* through 102*n*, one or more servers 106, one or more data sources 107, and network 110. Each of the components shown in FIG. 1 may be implemented via any type of computing device, such as computing device 1000 described in connection to FIG. 10, for example. These components may communicate with each other via network 110, which may include, without limitation, one or more local area networks (LANs) and/or wide area networks (WANs). In exemplary implementations, network 110 comprises at least in part the Internet and/or a cellular network, amongst any of a variety of possible public and/or private networks.

User devices 102*a* and 102*b* through 102*n* may be client devices on the client-side of operating environment 100, while server(s) 106 may be on the server-side of operating environment 100. Server(s) 106 may comprise server-side software designed to work in conjunction with client-side software on user devices 102a and 102b through 102n to implement any combination of the features and functionalities discussed in the present disclosure. Data sources 107 may comprise network resources (e.g., servers, data centers, and/or data systems) which make access to data, such as but not limited to project resource content 109, available to any of the various constituents of operating environment 100. In various implementations, data sources 107 may comprise document servers, website servers, email servers, social media servers, cloud based concierge or shopping services, virtual assistants, gaming servers, or queryable databases, for example.

In aspects, the technology described herein may take the form of a collaborative content browser 104 running on any one or more of the user devices. The collaborative content browser 104 comprises, for example, a user application program that provides a visual interface on a user device to search for, display, and receive user interactions with, content hosted by a network server 106 and or data source 107 and accessible through network 110.

As previously mentioned and discussed in greater detail below, with the embodiments disclosed herein, the collaborative content browser 104 implements one or more collaborative browser workspaces for organizing project resources (for example, network content, documents, notes, bookmarks, search histories, and other information relevant to a project) within a collaborative browser workspace dedicated to that project. Moreover, each collaborative browser workspace defines a workspace shell (which includes for example, a browser tab) through which members of that collaborative browser workspace may manage, find, and use resources together in a collaborative manner. Project resources relevant to different projects can be separated into different collaborative browser workspaces, and also maintained separately from content obtained from general (e.g., non-project) browsing activities. The workspace shell for a collaborative browser workspace may comprise one or more browser tabs each rendering instances of different project resources currently open within that workspace.

Figure 3:
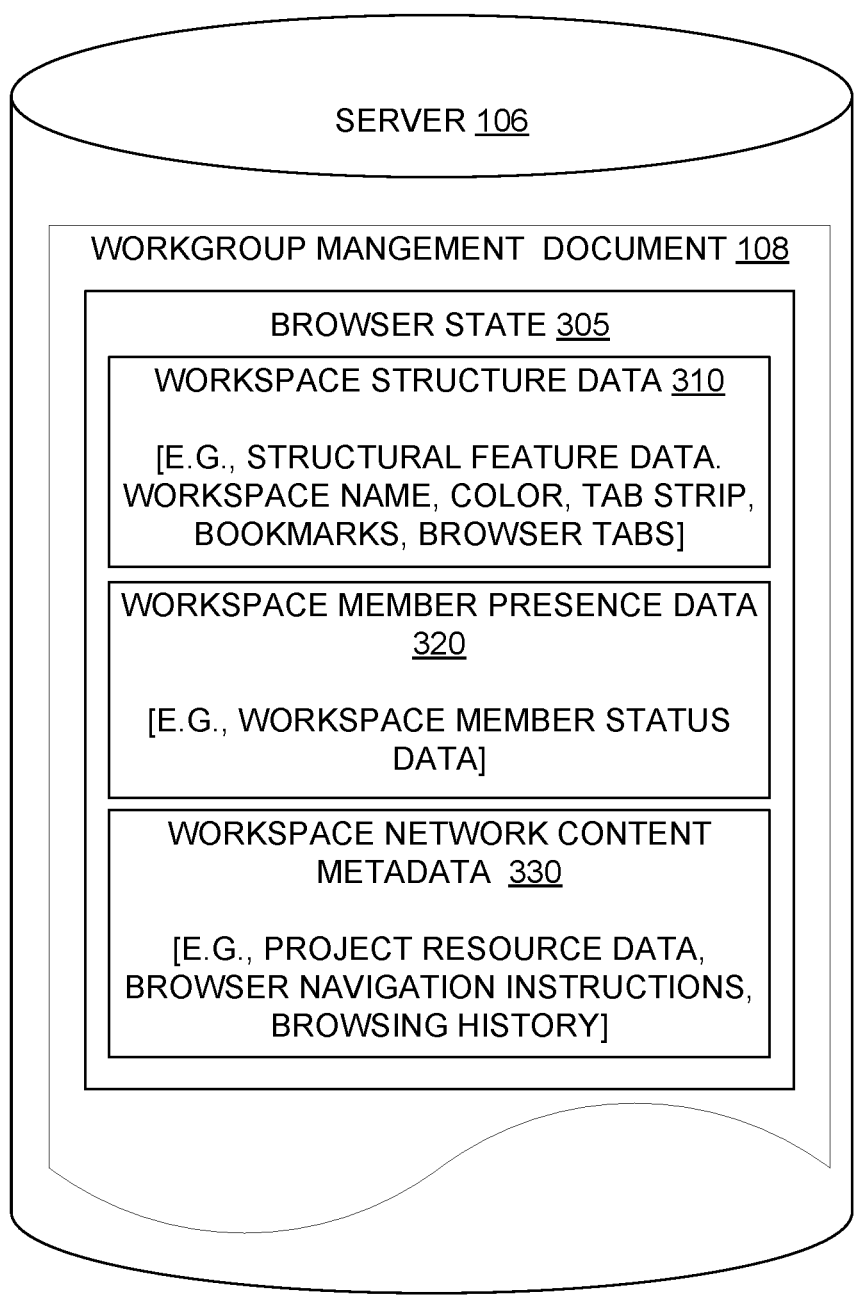
FIG. 3 is a block diagram of an example network hosted workspace management document suitable for implementations of the present disclosure.

In the embodiment of FIG. 1, the structural feature data and project resource data for one or more collaborative browser workspaces rendered by each collaborative content browser 104 are stored to, and synchronized with, a respective cloud hosted workspace management document 108 hosted by a server 106. The workspace management document 108 is a network resource that is accessible through the network 110 via a URL or other network address. Structural features such as, but not limited to, a workspace name or workspace identification (ID), a color identifier, an indication of the number of browser tabs included in the workspace and their respective names, and/or other information defining the appearance and structural organization of the workspace, may be defined and maintained as structural feature data in a browser state recorded by the workspace management document 108 (as shown in FIG. 3). Project resource content 109 may include, for example, network addresses (e.g., URLs) for accessing the project resource content 109 from data sources 107.

In some embodiments, a server 106 is not limited to using any particular client-server technology or framework, but may execute any framework that provides read and write access for the workspace management document 108 to a collaborative content browser 104. For example, in some embodiments, the server 106 executes the MICROSOFT FLUID framework, or other client centric application model with data persistence that does not rely on custom server code to interact with the collaborative content browser 104. In some embodiments, other than detecting that the collaborative content browser 104 is executing a compatible client framework, the server 106 does not know the contents of workspace management document 108 or details of how it is used.

In the example of FIG. 1, the user devices 102a and 102b may each comprise respective collaborative content browsers 104 that render at least one collaborative browser workspace based on the cloud hosted workspace management document 108 hosted by server 106. When the collaborative content browsers 104 respond to user instructions to create a new collaborative browser workspace, the workspace management document 108 is created on server 106. In some embodiments, a network address (e.g., a URL) for the workspace management document 108 may be saved as a user workspace preference that a user (also referred to herein as a workspace member) may select to load the collaborative browser workspace in their collaborative content browser 104.

For example, after launching their collaborative content browser 104, a workspace member "A" using user device 102a can select a user workspace preference associated with the workspace management document 108 to cause their collaborative content browser 104 to load the workspace management document 108 and render the previously created collaborative browser workspace. Moreover, upon rendering the structure of the collaborative browser workspace using the structural feature data, the collaborative content browser 104 can use the project resource data to reload the collaborative browser workspace with one or more items of previously curated project resource content 109, including for example, websites, documents, notes, and other network content, and also reload bookmarks, search history and/or browsing history related to the collaborative browser workspace. In some embodiments, metadata for these project resources, including network addresses (e.g., the URLs), are synchronized to the project resource data of the workspace management document 108 rather than the content itself such that the browser state recorded by the workspace management document 108 includes information that points to the network resources where project resources may be found.

In some embodiments, workspace member "B" using a collaborative content browser 104 on user device 102b can be invited by the workspace member A to join the collaborative browser workspace. Workspace member A may do so by sending a message to workspace member B that provides the URL for the workspace management document 108. The collaborative content browser 104 of user device 102b uses the URL provided by the invitation to load the workspace management document 108 from server 106 and create a workspace shell that renders the collaborative browser workspace with the same structural features as rendered for workspace member A, and with presentation of the same previously accumulated project resources.

Updates made by either workspace member A or B with respect to the structural features or project resources of the collaborative browser workspace are synchronized to the browser state of the workspace management document 108, and accordingly are synchronized to the collaborative content browser(s) 104 of each workspace member. Any number of members may be added to share the collaborative browser workspace in the same manner through an invitation or link that directs their respective collaborative content browser 104 to the workspace management document 108. Furthermore, workspace members can access the collaborative browser workspace from any user device from which a collaborative content browser 104 can be executed and the workspace management document 108 accessed. In this manner, a workspace member can move between multiple user devices and always pick up from the most current instance of the collaborative browser workspace.

In some embodiments, the workspace shell generated by the collaborative content browser 104 for a collaborative browser workspace includes a user interface that displays one or more member presence indicators. The member presence indicators provide a visual indication that alerts workspace members when other workspace members are present and/or are actively engaged with one or more project resources within the collaborative browser workspace. In some embodiments, the browser state of the workspace management document 108 further comprises workspace-member status data that is updated by the collaborative content browser 104 to indicate when a workspace member is rendering the collaborative browser workspace, and what browser tabs and/or project resources within the collaborative browser workspace they are currently engaged with. For example, a workspace member A may be currently editing a team wiki in the second browser tab of the collaborative browser workspace. This activity is synchronized to the workspace-member status data in the workspace management document 108. The collaborative content browser 104 for workspace member B may read this workspace member status data from the workspace management document 108 browser state and display at least one member presence indicator that indicates that workspace member A is currently working on a project resource in the second browser tab.

With respect to collaborative navigation, collaborative content browser 104 may also synchronize a user's browsing activity with the workspace management document 108. For each browsing tab of the collaborative browser workspace in which any workspace member is actively browsing a network resource, browser navigation instructions are synchronized to the workspace management document 108 browser state. For example, a workspace member A on user device 102a may direct a first browsing tab to a cloud based content creation application and begin editing a document. In response, the collaborative content browser 104 for workspace member A will update the workspace management document 108 to both update workspace member status data to show that workspace member A is engaged with the first browsing tab, and with browser navigation instructions indicating a network address that would direct a browser to the same cloud based content creation application and document. Similarly, a workspace member B on user device 102b may direct a second browsing tab of the collaborative browser workspace to a network video streaming service to receiver streaming video content. The collaborative content browser 104 for workspace member B will update the workspace management document 108 to both update workspace member status data to show that workspace member B is engaged with the second browsing tab, and with browser navigation instructions indicating a network address that would direct a browser to the network video streaming service and video content. Workspace member B may observe from a member presence indicator displayed on user device 102b that workspace member A is working in the first browsing tab, and decide to select the first browsing tab from within their workspace shell (e.g., to see what workspace member A is working on and potentially collaborate). When workspace member B selects the first browsing tab of their collaborative content browser 104, their collaborative content browser 104 navigates to the cloud based content creation application and document in use by workspace member A, based on the browser navigation instructions last synchronized to the workspace management document 108 by workspace member A. Moreover, a member presence indicator in the user interface for user device 102a will indicate to workspace member A that workspace member B is now present in the first browsing tab.

From that point, the first browsing tab of the collaborative browser workspace in each of their respective collaborative content browsers 104 are engaged in collaborative navigation via synchronization with the workspace management document 108. When either workspace member navigates the first browsing tab of the collaborative browser workspace to another network resource, the first browsing tab for other workspace member(s) will navigate to the new site. As previously mentioned, while the collaborative content browser for each respective member is navigating to the same network resource, each collaborative content browser is independently served and renders content directly from the network resource.

This operating environment 100 is provided to illustrate one example of a suitable environment, and there is no requirement for each implementation that any combination of server(s) 106, data source(s) 107 and user devices 102a and 102b through 102n remain as separate entities. User devices 102a and 102b through 102n may comprise any type of computing device capable of use by a user. For example, in one aspect, user devices 102a through 102n may be the type of computing device 1000 described in relation to FIG. 10 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), a video player, a handheld communications device, a gaming device or system, an entertainment system, a vehicle computer system, an embedded system controller, a remote control, an appliance, a consumer electronic device, a workstation, or any combination of these delineated devices, or any other suitable device. In other embodiments, one or more user devices 102a and 102b through 102n may comprise virtualized machines implemented at least in part on a cloud computing platform.

Figure 2:
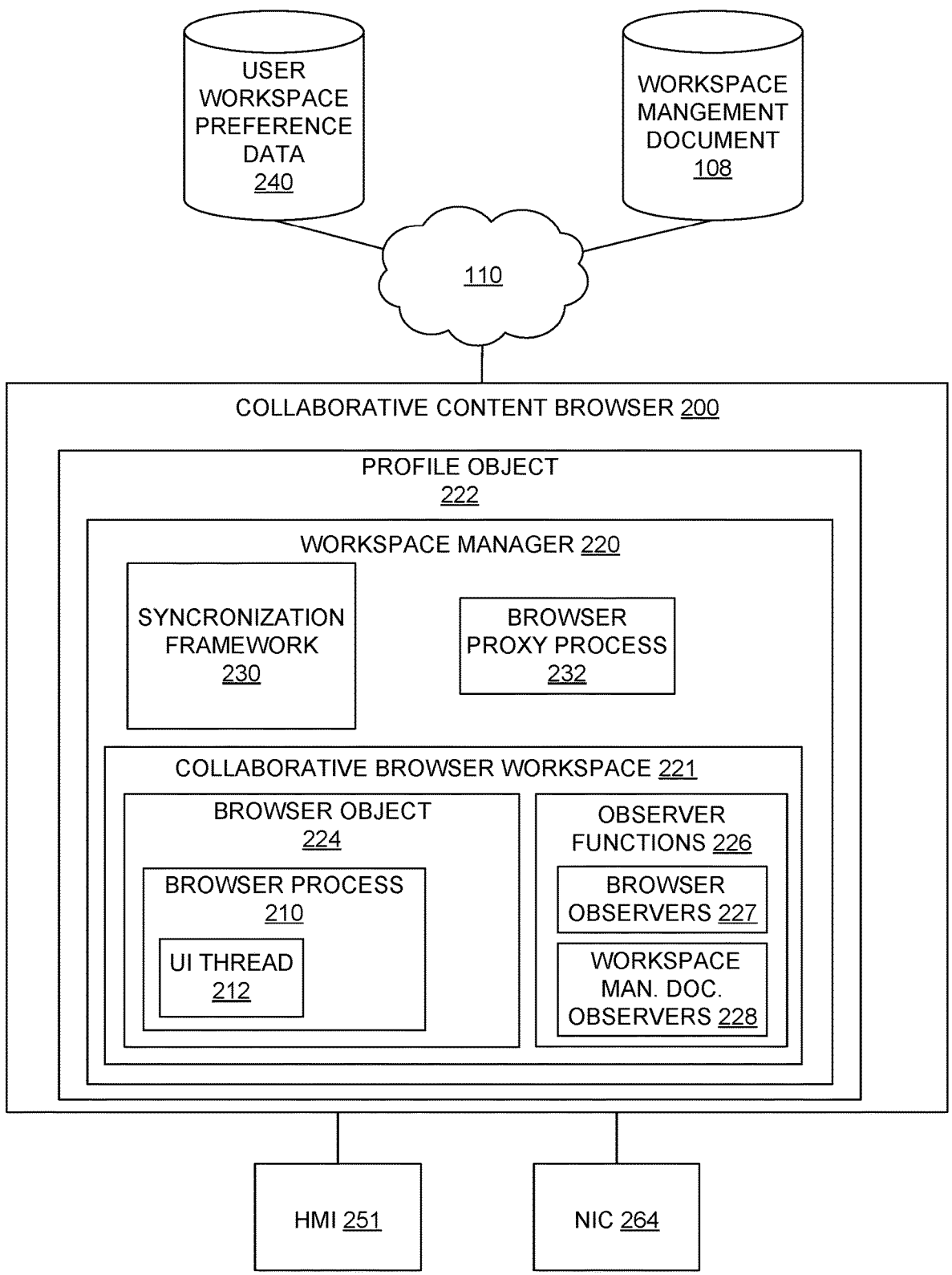
FIG. 2 is a block diagram of an example collaborative content browser suitable for implementations of the present disclosure.

Referring now to FIG. 2, FIG. 2 is a block diagram illustrating elements of a collaborative content browser 200, such as collaborative content browser 104. Collaborative content browser 200 comprises components including, but not limited to, a browser process 210, a workspace manager 220, a synchronization framework 230, and an inter-process communication layer (IPC) (not shown) that carries communications between the components of the collaborative content browser 200. In some embodiments, the collaborative content browser 200 may further comprise a browser proxy process 232 used, in some embodiments, by the workspace manager 220 to control aspects of the browser process 210, as further detailed below.

The collaborative content browser 200 may interact with hardware layer elements of the user device such as a human-machine interface (HMI) 251 through which a user interacts with the collaborative content browser 200. The HMI 251 may comprise input/output (I/O) elements such as, but not limited to, a display, keyboard, pointer device, audio input and/or audio output. The collaborative content browser 200 may also interact with hardware layer elements such as a network interface controller (NIC) 264. The NIC 264 (also known as a network interface card, network adapter, LAN adapter or physical network interface) is a computer hardware component that connects a computer to a computer network. The NIC 264 may be used by the collaborative content browser 200 to communicate over a computer network, such as network 110, either by using cables or wirelessly.

Figure 10:
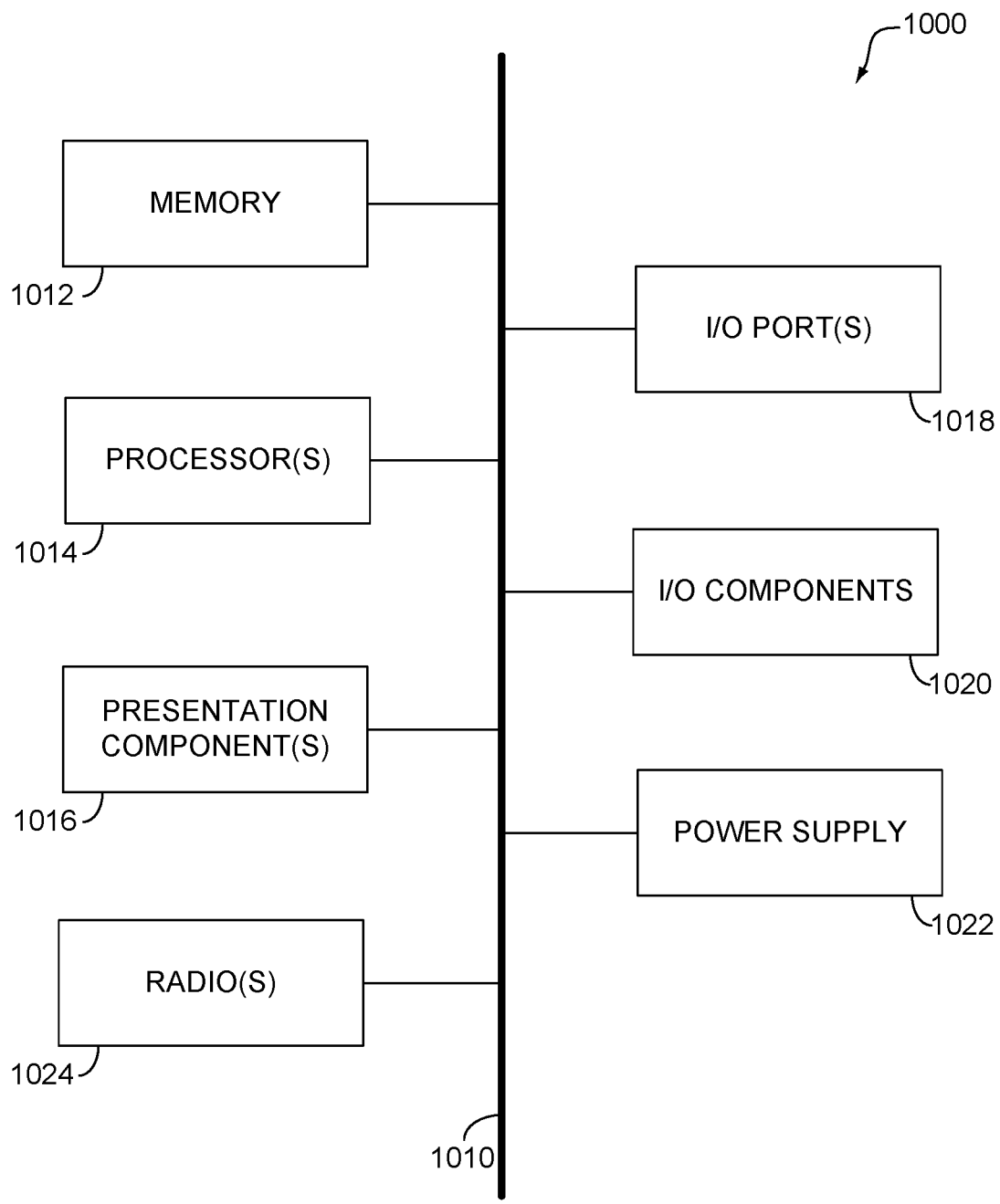
FIG. 10 is a block diagram illustrating a computing device suitable for use with aspects of the technology described herein.

The browser process 210 executes one or more threads (e.g., on the processor(s) 1014 discussed with respect to FIG. 10) to implement the network navigation and rendering functions of a content browser as described herein. These threads include, among other elements, a user interface thread 212 that renders onto the HMI 251 one or more workspace shells including at least one browser tab for a collaborative browser workspace. When a workspace management document 108 is retrieved, the browser process 210 is the element of the collaborative content browser 200 that generates a workspace shell with a user interface in accordance with the structural feature data defined by the workspace management document 108, including a tab strip with one or more browser tabs among other user interface elements. Further details regarding the user interface for a collaborative browser workspace are discussed below with respect to FIGS. 4 and 5.

Using the project resource data, the browser process 210 may also retrieve and render one or more elements of project resource content 109 and/or other shared content in the one or more browsing tabs of the collaborative browser workspace. The browser process 210 further operates to receive user interactions (e.g., via HMI 251) for controlling the collaborative content browser 200, modifying the structural features of a collaborative browser workspace (e.g., adding or removing browser tabs), and/or navigating the browsing windows of browsing tabs to network resources.

In the embodiment shown in FIG. 2, the workspace manager 220 functions to manage aspects of the collaborative browser workspaces displayed by the browser process 210, and for a given collaborative browser workspace 221, includes a profile object 222, a browser object 224, and one or more observer functions 226.

In some embodiments, the browser process 210 may respond to a user input (e.g., received via HMI 251) to open a pre-existing workspace selected by the user. To generate an instance of the user selected collaborative browser workspace, the workspace manager 220 accesses user workspace preference data 240, which may comprise a network address (e.g., a URL) directing the workspace manager 220 to the server 106 hosting the workspace management document 108. In some embodiments, the user workspace preference data 240 may itself be retrieved from a network resource such as a server 106 or data source 107.

On execution of the collaborative content browser 200, the profile object 222 may spawn the workspace manager 220. The profile object 222 may comprise a user profile that includes ID information for the user and/or other information such as, but not limited to, access tokens that may be used to obtain access to network resources. In some embodiments, the profile object 222 may include personal information associated with the user obtained through a user login/authentication process such as, but not limited to, the user's name, email address, phone number, and/or cookies, download history, content collections, browser extensions, or other data pertinent to the user. In some embodiments, the profile object 222 may include identity information and/or access tokens provided by a user authentication service such as, but not limited to, directory services (DS), Active Directory (AD), a MICROSOFT Account (MSA) server, or the like. As such, the profile object 222 corresponds to information relating to the signed-in user of the collaborative content browser 200. In some embodiments, the user interface of the collaborative browser workspace provides a profile interface via which the user may access the profile object 222 to review personal information associated with the user. The profile interface may provide controls that permit the user to select which information is shared with other workspace members (for example, to opt-in or opt-out of sharing of specific items of personal information). In some embodiments, the profile interface may further accept input from the user to make any corrections to the personal information stored in the profile object 222.

The workspace manager 220 spawns a browser object 224 that corresponds to the workspace shell and collaborative browser workspace rendered by the browser process 210. Browser object 224 comprises a tab strip model and bookmarks bar model that are uniquely associated to the browser object 224. The browser object 224 further includes definitions from the structural feature data of the workspace management document 108, such as a workspace name or workspace ID, a color identifier, an indication of the number of browser tabs included in the workspace and their respective names, and/or other information defining the appearance and structural organization of the workspace to be rendered by the browser process 210. In some embodiments, the browser object 224 further comprises workspace member status data used by the browser process 210 to render member presence indicators. In some embodiments, individual data elements represented in the browser object 224 (e.g., browser tabs, bookmarks, documents, notes, and other network content, search history and/or browsing history may each be represented by an identifier such as a Globally Unique Identifier (GUID) or Universally Unique Identifier (UUID) that is maintained in one or more indexes of the browser object 224.

The browser process 210 thus renders the workspace shell and user interface of the collaborative browser workspace in accordance with the browser object 224. Moreover, the workspace manager 220 may update the browser object 224 based on user initiated modifications to features of the collaborative browser workspace. For example, when a new browser tab is added to the collaborative browser workspace by the user, the tab strip model of the browser object 224 is updated to include details for the new browser tab. When a new bookmark is added to the collaborative browser workspace by the user, the bookmarks bar model of the browser object 224 is updated to include the bookmark. When the user moves from one browser tab to another browser tab, the workspace-member status data may be updated to show that the user is now present in the newly selected browser tab. In some embodiments, workspace management document 108 is updated to reflect these and/or other changes to the browser object 224. Conversely, the browser object 224 may be updated based on changes applied to the workspace management document 108 by other workspace members. In this way, the user experience of using the collaborative browser workspace is synchronized across workspace members.

The observer functions 226 represent the components of the workspace manager 220 responsible for dynamically detecting and propagating changes affecting various aspects of the collaborative browser workspace, including structure and content. More specifically, the observer functions 226 operate to manipulate the structural features and content appearing in the workspace shell of the collaborative browser workspace to match those defined by the workspace management document 108 and vice versa.

In some embodiments, observer functions 226 comprise browser observers 227 and workspace-management document observers 228. The browser observers 227 monitor activities within the workspace shell controlled by the browser processes 210. The browser observers 227 may include at least a structure observer, a content observer, and a presence observer. The structure observer monitors for changes made to structural features, for example when a user adds, deletes, reorders, and/or renames, browser tabs or other updates to the tab strip model, or changes attributes of the collaborative browser workspace such as the assigned workspace name, color, or other identifiers. The content observer monitors for changes relevant to content within the browser tab(s) from network resources and when a browser tab is navigated to new content. In some embodiments, the collaborative navigation described herein, including generation of the browser navigation instructions, are performed based on content changes detected by the content observer. Updates to a structural feature such as the workspace bookmarks bar may be observed by one or both of the structure observer and content observer. For example, the structure observer may detect the addition and placement of a new bookmark element within the bookmarks bar, while the content observer detects the network address associated with the new bookmark element and any meta data associated with the bookmark (e.g., a favicon). The presence observer monitors the user's active presence within (e.g., interactions with) the collaborative browser workspace and/ or which of the one or more browser tabs are currently in use by the user. Changes to each of these various elements, or other elements, within the workspace shell that browser observers 227 monitor may be reflected by corresponding changes to elements of the browser object 224. In some embodiments, the workspace manager 220 identifies updates to be synchronized to the workspace management document based on the determinations of the browser observers 227.

Workspace-management document observers 228 essentially perform the converse operation as the browser observers 227. Workspace-management document observers 228 monitor and determine when changes are made to data in the workspace management document 108 with respect to structural features, network resource content, and presence. Based on the detected changes, the workspace manager 220 controls the browser process 210 to realize corresponding changes displayed within the workspace shell for the collaborative browser workspace and update the browser object 224 accordingly.

Synchronization framework 230 comprises the client-server implementation algorithms for synchronizing structure, content, and member presence data displayed for the collaborative browser workspace by the browser process 210 with the workspace management document 108. The synchronization framework 230 communicates with the workspace manager 220, and via network 110 communicates with the network server 106 hosting the workspace management document 108. As previously mentioned, in some embodiments, the workspace management document 108 may be hosted by any network server 106 from which the collaborative content browser 104 is able to read from and write to. For example, the workspace management document 108 may be hosted on a simple file share server or shared folder on a cloud-computing platform. The server 106 is therefore not limited to any particular client-server technology or framework. The synchronization framework 230 may accordingly comprise any framework that enables synchronization of data between the workspace management document 108 and the collaborative content browser 104. For example, in some embodiments, the server 106 executes the MICROSOFT FLUID framework, or other client centric application model with data persistence that does not rely on custom server code, and the synchronization framework 230 comprises a compatible client side MICROSOFT FLUID framework. In other embodiments, other client-server frameworks may be used.

In some embodiments, when the workspace manager 220 initiates a synchronization of data from the browser object 224 and/or the profile object 222 with the workspace management document 108, the workspace manager 220 sends a synchronization command to the synchronization framework 230. The synchronization framework 230 identifies the existence of un-synchronized data on the workspace manager 220 and uploads that data to the server 106 to update the workspace management document 108. The synchronization framework 230 also identifies the existence of un-synchronized data on the workspace management document 108 and downloads that data to update the browser object 224 and/or the profile object 222. Data synchronization may be based on the user identifiers (e.g., GUID or UUID) associated with each element of data being synchronized. The synchronization framework 230 is also configured to execute one or more synchronization conflict resolution (e.g., crash resolution) protocols to handle synchronization errors (e.g., such as when the same data element has an unsynchronized data update on both the workspace manager 220 and the workspace management document 108).

In some embodiments, the collaborative content browser 200 optionally executes a browser proxy process 232 that is used by the workspace manager 220 to control aspects of the browser process 210. While the various background processes comprising components of an application are typically written in the same programming language, it is sometimes desirable to add a new functionality to an established application using new code written in a different programming language than the existing code. For example, with respect to the collaborative content browser 200, the browser process 210 may include threads of legacy code that have proven robustness (such as code compiled from C++). The workspace manager 220, in contrast, may be written in a programming language having native functions more appropriate for implementing network or cloud savvy processes. In some embodiments, to provide an interface between the workspace manager 220 and browser process 210, the browser proxy process 232 uses the browser object 224 to generate a browser compatible proxy web page that includes code in a programing language directly executable by the browser process 210 (such as using JavaScript or MICROSOFT TYPESCRIPT, for example). The browser proxy process 232 may then launch a background proxy web page in the browser process 210 and utilize the proxy web page to control the browser process 210 with respect to rendering the structural features and content defined by the workspace management document 108. This proxy web page may be executed as a hidden process (e.g., within a hidden browser tab) that has the features of a standard web page, but is not displayed to the HMI 251.

In some embodiments, the browser proxy process 232 comprises a framework application that represents the browser process 210 (such as a MICROSOFT FLUID framework application, for example) that is in communication with the workspace manager 220 via the IPC. The browser proxy process 232 creates and dynamically updates the code of the proxy web page based at least in part on the contents of the browser object 224. In some embodiments, the proxy web page may be generated from a pre-generated web page template included as part of the collaborative content browser 104.

Referring now to FIG. 3, FIG. 3 illustrates a workspace management document 108 in accordance with some embodiments of the present disclosure. The workspace management document 108 comprises a browser state 305 that in essence comprises a representation of browser data structures for a specific collaborative browser workspace, stored in a cloud document. As discussed throughout this disclosure, the browser state 305 of the workspace management document 108 maintains the data and metadata for defining the browser object 224 from which the browser process 210 renders the collaborative browser workspace in a workspace shell generated by the collaborative content browser 104. As shown in FIG. 3, the browser state 305 comprises workspace structure data 310, workspace-member presence data 320, and workspace network content metadata 330.

The workspace structure data 310 comprises the structural feature data for a collaborative browser workspace and may include at least a tab strip model and a bookmarks bar. The tab strip model includes data such as, but not limited to, a workspace name and/or color associated with the workspace that may be displayed on the tab strip of the workspace shell for the workspace, the number of browser tabs that have been created for the workspace, and a browser tab name for each of the browser tabs that have been created for the workspace. The bookmarks bar (which may also be referred to as a "favorites" bar) includes data such as the name and URL of various network resources (e.g., "bookmarks") that workspace members have saved for quick reference for display within the workspace shell. In some embodiments, the bookmarks data may include bookmarks that are global and available regardless of which browser tab is open, or may be browser tab specific and available based on which browser tab is open. In some embodiments, the workspace member presence data 320, includes workspace member status data such as: a name, user ID and/or electronic contact information (e.g., a network user ID, an email address, an instant messaging ID, or the like) for each workspace member currently engaged in the collaborative browser workspace. This determination of the workspace members currently engaged in the collaborative browser workspace may be based, for example, on identification information from the profile object 222 provided by each workspace manager 220 that has an open data channel to the workspace management document 108. The workspace-member presence data 320 may further include data obtained from each workspace manager 220 indicating the browser tab that each workspace member currently has open and displayed on their respective collaborative content browser 104.

The workspace network content metadata 330 includes the project resource data, including for example, browsing histories and browser navigation instructions used for collaborative navigation. In some embodiments, the browser navigation instructions are dynamically received from the workspace manager 220 in response to the user entering navigation commands (either by manually entered URL, or by hyperlink) within the open browser tab of their collaborative content browser 104. The browser navigation instructions received from the workspace manager 220 may comprise a verbatim URL from the navigation command, or an abstraction or other representation that will direct a browser of other workspace members to the same content (as further discussed below). In some embodiments, the workspace network content metadata 330 may further include a browsing history for the workspace that is synchronized to each workspace manager 220 so that each workspace member can review prior network resources viewed by other workspace members.

In some embodiments, each element of data saved to the workspace management document 108 is associated with unique identifier such as a GUID or UUID, or a similar unique identifier, with which the workspace manager 220 can use as a reference when synchronizing data from the browser object 224 with the workspace management document 108 and browser state 305.

With respect to collaborative navigation, there may be instances where one or more intervening administrative web pages (such as splash pages or authentication pages, for example) must be negotiated by a workspace member before their browser can reach the same network resource in use by another workspace member as indicated by browser navigation instructions from the workspace management document 108. It is typically not desirable to synchronize a workspace member's navigation to such interviewing web pages to the workspace management document 108. For example, it would not be desirable to navigate a first workspace member off a website page in response to a need for a second workspace member to use a sign-in page to authenticate themselves with that website. Accordingly, in some embodiments, the workspace manager 220 may comprise a state machine or other rules based algorithm that determines which browser navigation instructions are synchronized to the workspace management document 108, and which are not. For example the workspace manager 220 may determine when the result of a navigation command (or an automatic navigation re-direct initiated by a website) has directed the browser tab to an administrative web page (such as a sign-in page, a splash page, or an error page, for example) and block propagation of browser navigation instructions to such pages to the workspace management document 108.

In some embodiments, browser navigation instructions synchronized to the workspace management document 108 comprise an abstraction or other representation of a URL for directing a browser to a network resource. Such abstractions are referred to herein as "mapping links" which may be shared as browser navigation instructions to the workspace management document 108 in place of the URL actually used by a workspace member to navigate to a resource. In some embodiments, the workspace manager 220 identifies when a URL comprises a non-sharable link (e.g., a link personalized to a specific user that will not work for other users, such as a link comprising an encrypted access token), and generates a sharing link that may be used by others to facilitate reaching the desired network resource. For example, the sharing link may direct a user to a web page (e.g., a sign-on screen) from which a personalized link with encrypted access token can be obtained to reach the desired network resource. In other embodiments, a mapping link shared via the browser navigation instructions may direct a user to a file on a network share drive from which a sharing link may be redeemed.

In some embodiments, the collaborative content browser 104 may further include integrations (e.g., plug-ins and/or extensions) that may be accessed from within the workshare shell for one or more collaborative communication applications, such as instant messaging (IM), chat, or audio/video conferencing programs (such as MICROSOFT SKYPE and/ or MICROSOFT TEAMS, for example). Such integrations facilitate real-time communications between workspace members that are actively engaged in the workspace. In other embodiments, the collaborative content browser 104 may further include integrations for annotating browsed resources with notes (e.g., virtual sticky notes) that may be displayed to workspace members via the tab browsers of the workspace.

Figure 4:
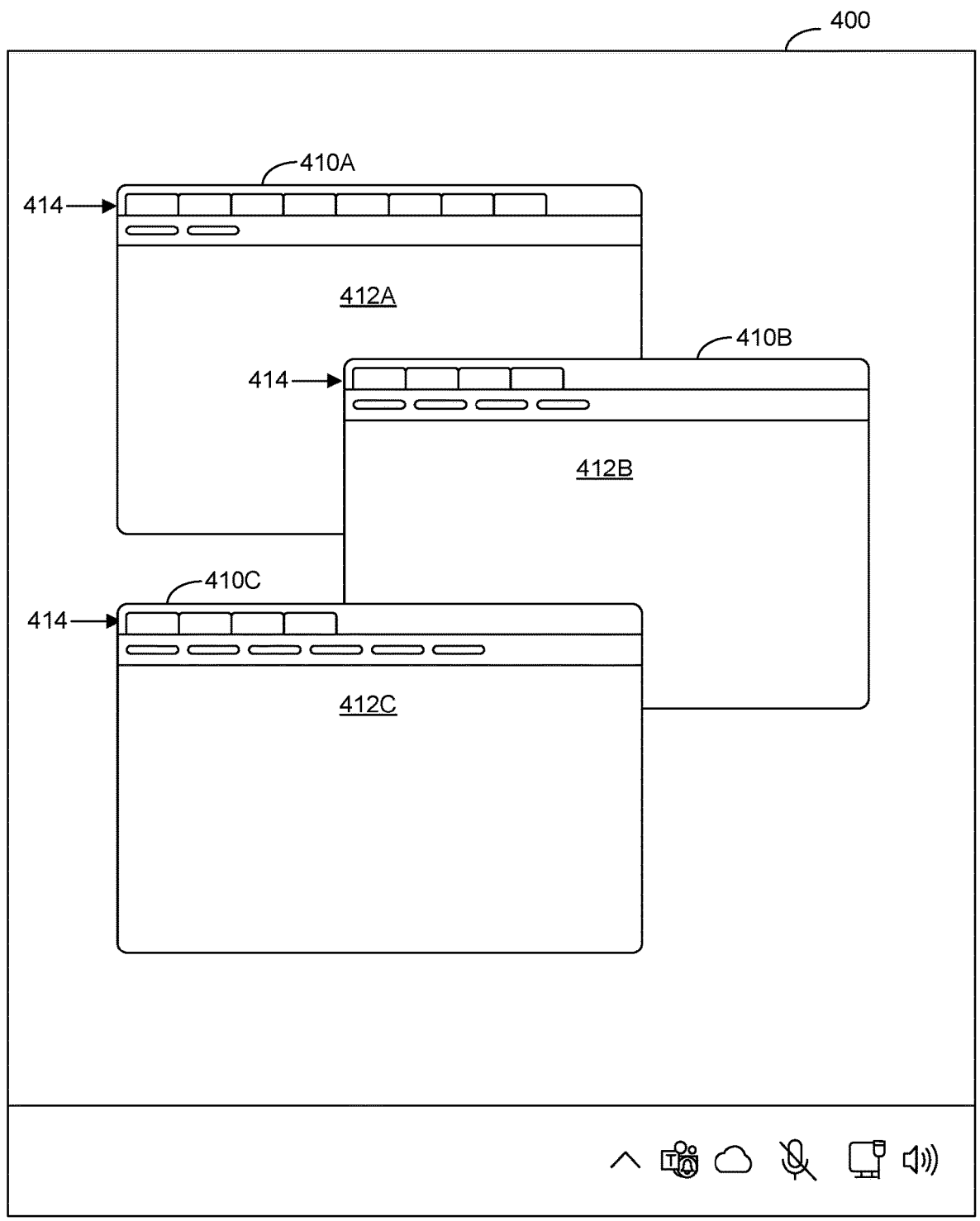
FIGS. 4, 5A, and 5B are diagrams illustrating examples of embodiments for collaborative content browser user interfaces.

Referring to FIG. 4, FIG. 4 is an example display 400 presented by the HMI 251 (e.g., a display device) of a user device including a user interface for the collaborative content browser 104 according to one embodiment. As shown in this example, the collaborative content browser 104 may generate one or more workspace shells (shown at 410a, 410b, 410c). Each of the workspace shells is independently associated with a different collaborative browser workspace and each is synchronized with a different respective workspace management document 108. In some embodiments, the workspace manager 220 instantiates a dedicated profile object, browser object, and observer functions for each of the workspace shells 410a, 410b, 410c, each of which is operating as described herein. Each of the workspace shells includes a user interface (shown at 412a, 412b, 412c). Each user interface 412a, 412b, 412c has at least one feature comprising a workspace identification indicator 414 (e.g., a color, graphic, text, or other feature) that is specifically associated with a collaborative browser workspace to assist a user in quickly identifying which workspace shell corresponds to which collaborative browser workspace. For example, in some embodiments, the user interfaces 412a, 412b, 412c, for each workspace implement a workspace identification indicator 414 using a unique color scheme. For example, the windows, browsing tabs, workspace shell title bar, or other items may be colored and/or labeled so that a user can differentiate one from the other. Using such workspace indicators may assist a user in understanding that the workspace shell they are using is a component of a shared workspace, as well as which workspace the shell is associated.

Figure 5A:
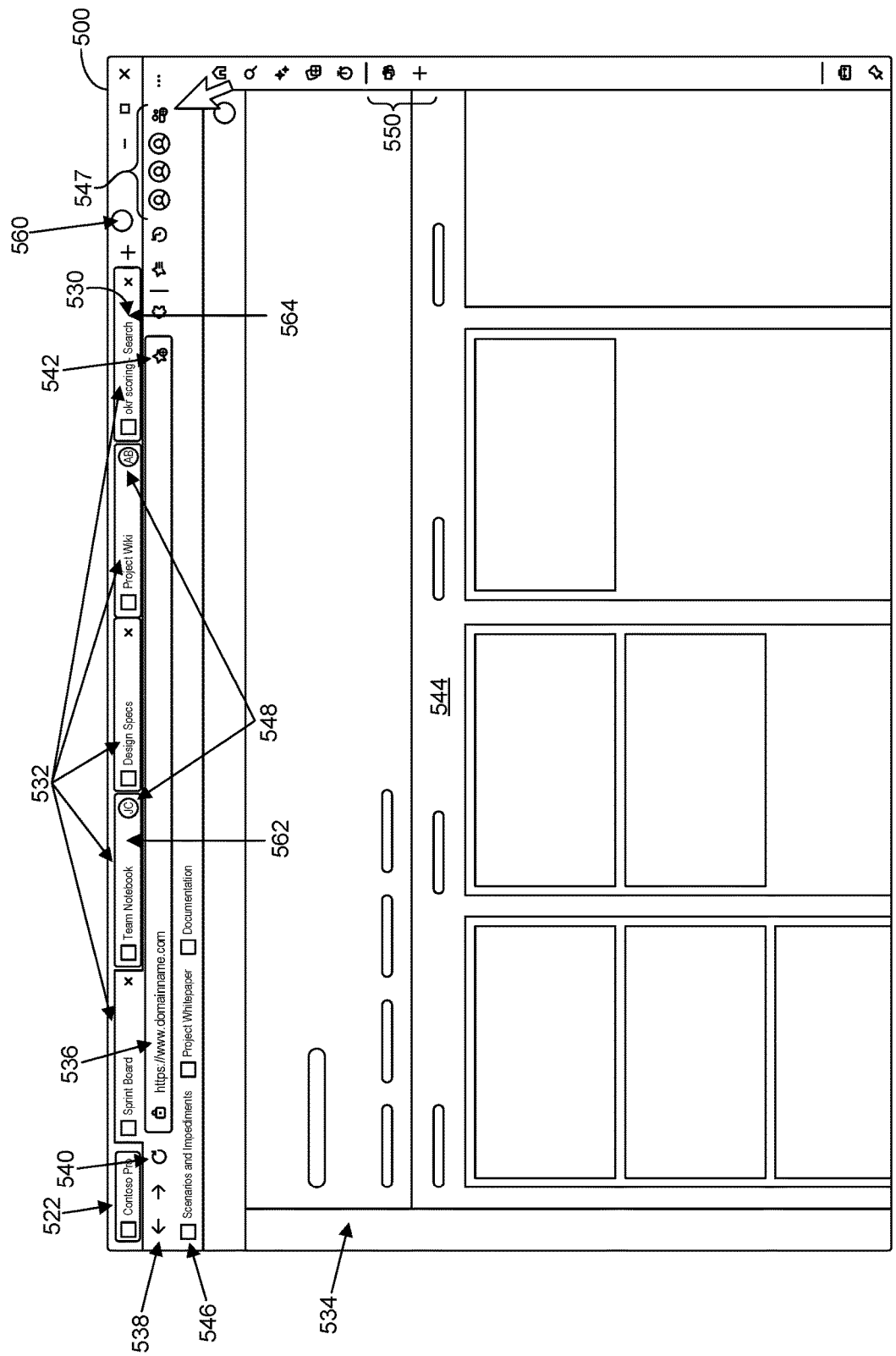

Referring to FIG. 5A, FIG. 5A is an example user interface (UI) 500 displayed for a collaborative browser workspace as rendered within a workspace shell by the UI thread 212 of browser process 210. The tabs and other content shown in the collaborative browser workspace in FIG. 5A may be selected through a browser in which a collaborative browser workspace is not displayed. Such a browser may not have elements 522, 548, 547, and/or 550, and may have additional tabs beyond just the selection tabs 532. A user can select content, such as the selection tabs 532 and then interact with a user interface control to add the selection tabs 532 into the collaborative workspace, as shown in FIG. 5A. The user interaction may automatically transition the browser view from an unshared and/or unorganized browser to the shared and/or organized browser shown in FIG. 5A.

In some embodiments, UI 500 includes a workspace selection button 522. Using the workspace selection button 522, the user may select which collaborative browser workspace is rendered in that workspace shell. For example, activation of the workspace selection button 522 may cause the UI 500 to display a listing of available collaborative browser workspaces (e.g., from the user workspace preference data 240). Based on the selection of a collaborative browser workspace from the listing, the workspace manager 220 will obtain the network address for the corresponding workspace management document 108 (e.g., from the user workspace preference data 240) and render the collaborative browser workspace within the UI 500 as described by this disclosure.

The UI 500 may include a browser tab strip 530 comprising selection tabs 532 for one or more browser tabs. Each selection tab 532 may include the name of a corresponding browser tab. In the example of FIG. 5A, a first browser tab 534 is open and displayed by the UI 500. Browser tab 534 includes an address field 536 within which the user may enter a network address (such as a URL, for example) to navigate the browser tab 534 to a network resource. The cursor movement and user typing may be visible in real time to other users viewing the collaborative workspace. The address field 536 may also display a name or network address for the network resource being currently rendered. In some embodiments, the UI 500 may further include navigation buttons 538 (to page back-and-forth between recently viewed content) a refresh button 540 (to reload a page of content from a network resource), and a bookmark button 542 to store the current page as a bookmark. A display window 544 is provide by the UI 500 as space within a tab browser in which project content from network resources (e.g., websites, documents, video streams, web applications) is rendered and where the user can interact with the content (e.g., via a pointer, touchscreen, voice, or similar modality). At 546, a bookmark bar is illustrated comprising bookmarks (e.g., a saved link to a network resource) curated for use by workspace members of the collaborative browser workspace. In some embodiments, the bookmark bar 546 may include bookmarks that are global and apply to all collaborative browser workspaces, or focused bookmarks that apply specifically to the currently active collaborative browser workspace. In some embodiments, the UI 500 may display controls for other browser functions. User interactions with each of these components of the UI 500 may be detected and acted upon by the observer function 226 for updating the workspace management document 108 as discussed elsewhere herein.

In some embodiments, the UI 500 may display at least one member presence indicator 547 that displays text and/or a graphic when other workspace members are online and working within the same collaborative browser workspace. The UI 500 may also display browser tab specific member presence indicators 548 showing when other workspace members are online and working within a specific browser tab of the collaborative browser workspace. The UI 500 may also optionally display an application bar comprising one or more buttons 550 to execute integrations such as IM, chat, audio/video conferencing programs, virtual sticky notes, or other user collaboration tools. It should be understood that the UI 500 disclosed herein for a collaborative browser workspace is not limited to any type of user device.

The tab-group control 560 allows a user to add a group of selected tabs to a tab group. Tab groups are a way to organize tabs and conserve limited user interface space. In one aspect, a tab group may be formed by selecting the tab-group control 560 and one or more tabs to add to the group. Other methods for forming tab groups are possible. For example, a user may start a tab group by right clicking or left clicking a tab and selecting "form tab group" from a menu. Similarly, a tab may be added to an existing group through a tab menu accessed by right clicking or left clicking a tab. In this example, tab 562 and tab 564 may be selected for inclusion in tab group A.

Figure 5B:
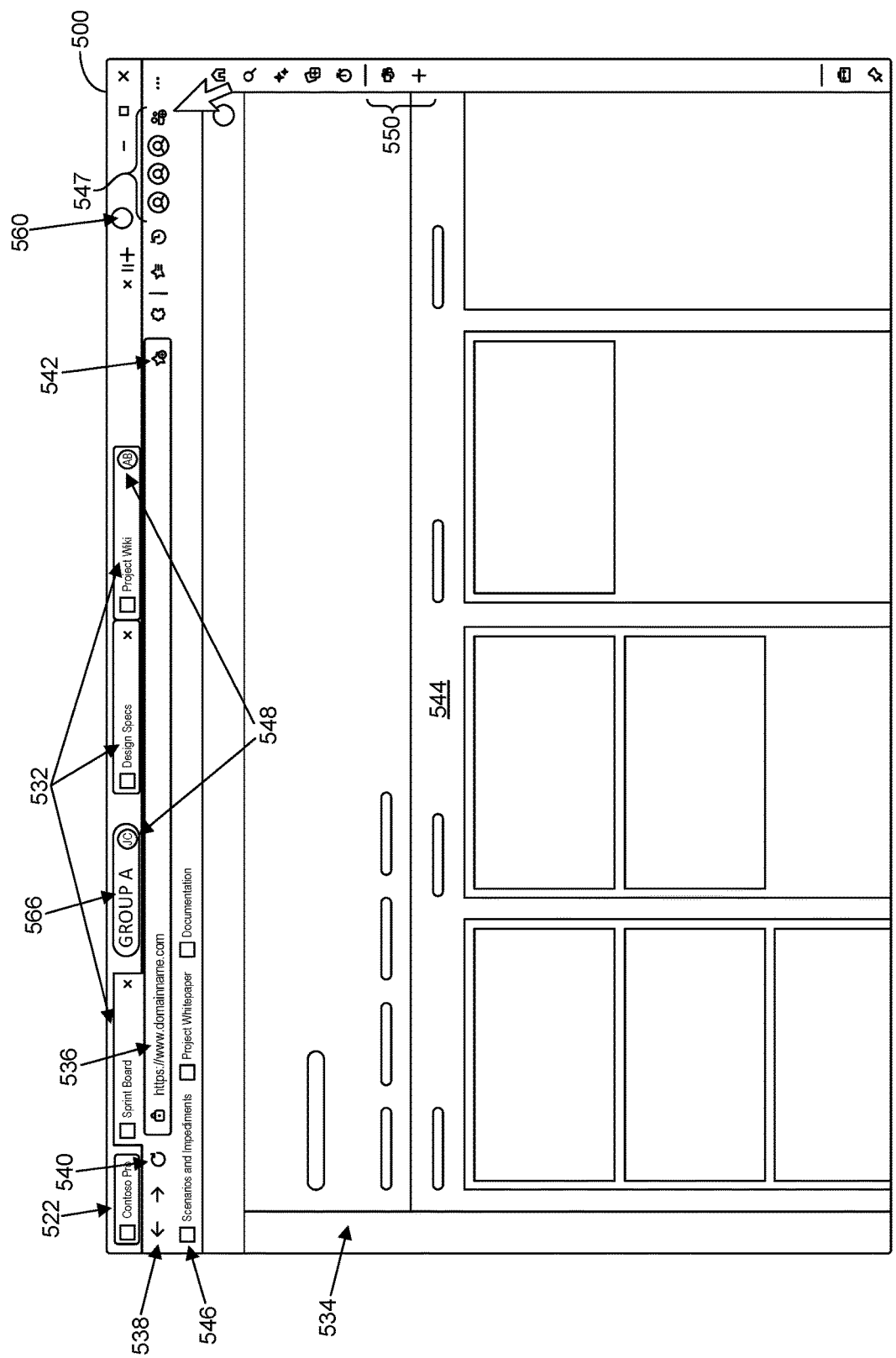

FIG. 5B illustrates the use of a tab group within a collaborative workspace, according to some embodiments. In FIG. 5B, tab 562 and tab 564 have been collapsed into the tab group A representation 566. Notice the tab group A representation includes a member presence indicator 548 showing that a group member is online and interacting with a tab (e.g., the tab 562) within tab group A. Tab group A is a tab group within a collaborative workspace. In an embodiment, it may be possible to select existing tab groups that are not associated with a workspace and associate them with the workspace. When the tab is outside of a workspace, collaboration with tab group is not enabled. By adding the tab group to the collaborative workspace, collaboration with the tab group is enabled. As illustrated in FIGS. 5A and 5B, it may be possible to form a new tab group from tabs that are already associated with a workspace.

FIGS. 6, 7, 8 and 9 are flow diagrams showing methods 600, 700, 800 and 900 for implementing various aspects of a collaborative content browser according to some embodiments. Each block of the methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by an operating system. In addition, methods 600, 700, 800 and 900 are described, by way of example, with respect to the other embodiments presented in the other figures herein. However, these methods may additionally or alternatively be executed by any one system, or any combination of systems, including, but not limited to, those described herein. It should therefore be understood that the features and elements described herein with respect to the methods of FIGS. 6, 7, 8 and 9 may be used in conjunction with, in combination with, or substituted for elements of, each other or with any of the other embodiments discussed herein and vice versa. Further, it should be understood that the functions, structures, and other descriptions of elements for embodiments described in FIGS. 6, 7, 8 and 9 may apply to like or similarly named or described elements across any of the figures and/or embodiments described herein and vice versa.

The collaborative content browsers provided by any of the methods 600, 700, 800 and 900 each utilize a workspace management document hosted on a shared network resource in order to synchronize structural features and network resource browsing activity across a network between separate user devices. The technical solution of using the workspace management document as a shared resource is a solution that produces a collaborative network browsing technology that, among other benefits, avoids bandwidth utilization burdens of direct peer-to-peer synchronization between browsers. Moreover, the solutions presented herein enhance the functionality of the underlying technology by reducing waste of computing resources that would otherwise be consumed by different users on the same project accessing network resources without knowledge of what resources other project users are using.

Figure 6:
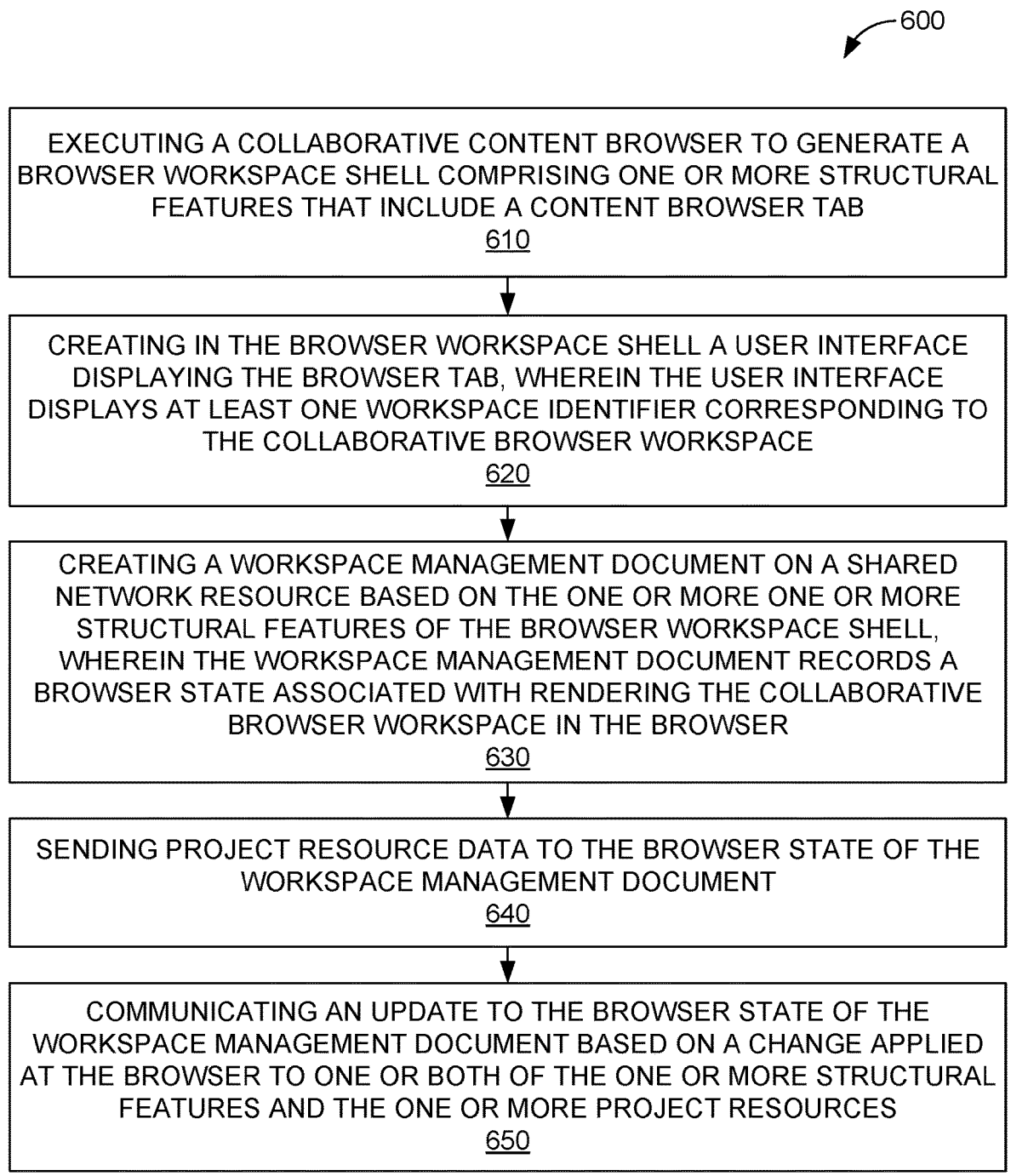
FIG. 6 is a flow diagram showing an example method for creating a collaborative browser workspace suitable for implementations of the present disclosure.

Referring to FIG. 6, FIG. 6 is a flow chart illustrating a method 600 for creating a new collaborative browser workspace according to some embodiments. The method 600 includes at 610 executing a collaborative content browser to generate a browser workspace shell comprising one or more structural features that include at least one content browser tab. As previously discussed, in some embodiments, in response to execution of the collaborative content browser, a workspace manager may spawn a profile object and browser object. The profile object may comprise a user profile that includes ID information for the user and/or other information such as, but not limited to, access tokens that may be used to obtain access to network resources. In some embodiments, the profile object may include personal information associated with the user such as, but not limited to, the user's name, email address, phone number, and/or cookies, download history, content collections, browser extensions, or other data pertinent to the user. Such information may include information obtained through a user login/authentication process. The browser object comprises information defining the appearance and structural organization of the workspace, and may be defined and maintained as workspace structure data in the workspace management document.

When setting up the collaborative browser workspace, the workspace manager 220 user may add project information to the browser object 224 based on information manually specified by the user, and/or based on one or more templates. In some embodiments, templates may be provided to allow a user to set up the workspace. For example, the workspace manager 220 may prompt the user to add workpace or project information (e.g., a workspace title), collaborative applications (e.g., IM, chat), and web sites for a favorites bar. The workspace may be set up according to the template, including the applications integrated right into the browser object 224. In some embodiments the workspace manager 220 may recommend documents and other networks resources as content for the new workspace based on a selected template. For example, when the workspace is set up using a template, selection of the template may trigger the integration of applications into browser object 224 and within the user interface, pin those applications to the application bar (as shown at 550 in FIG. 5). Moreover, the template may designate one or more default websites that are automatically populated onto a favorites bar (such as bookmarks bar 546). In some embodiments, instead of using a template, the user may manually enter workspace or project information, manually select collaborative applications, and select websites to be included in the favorites bar. In some embodiments, the user may manually add, delete, and/or alter project information, collaborative applications, and favorites bar content initially selected by a template.

The generation of the browser workspace shell may be based on structural features defined by the browser object including, but not limited to, a tab strip model and bookmarks bar model. The method 600 also includes at 620 creating in the browser workspace shell a user interface displaying a collaborative browser workspace comprising the one or more structural features, wherein the user interface displays at least one workspace identification indicator corresponding to the collaborative browser workspace. In some embodiments, the user interface may comprise the features and elements as described with respect to FIGS. 4 and 5.

The method further includes at 630 creating a workspace management document on a shared network resource based on the one or more one or more structural features of the browser workspace shell, wherein the workspace management document records a browser state associated with rendering the collaborative browser workspace in the browser. The workspace management document is a network resource that is accessible through a network via a URL or other network address. The structural features of the collaborative browser workspace include one or more of, but are not limited to, a workspace name or workspace ID, a color identifier, an indication of the number of browser tabs included in the workspace and their respective names, and/or other information defining the appearance and structural organization of the workspace. These structural features may be represented in the browser object for the collaborative browser workspace and saved as structural feature data of the workspace management document.

The method further includes at 640 sending project resource data to the browser state of the workspace management document. The project resource data comprises network addresses (e.g., URLs) associated with project resources. The project resource content may be hosted on data sources such as, but not limited to, document servers, website servers, email servers, social media servers, cloud based concierge or shopping services, virtual assistants, gaming servers, or queryable databases, for example. Project resources may include, for example, websites, documents, web applications, and other network contents, bookmarks, search histories, and other information relevant to a project.

The method at 650 includes communicating an update to the browser state of the workspace management document based on a change applied at the browser to one or both of the one or more structural features and the one or more project resources. In this way, subsequent changes related to the one or more structural features and the project resource data are synchronized with the browser state of the workspace management document. As previously discussed above, the resulting workspace-management document comprises a representation of the collaborative browser workspace as currently displayed and utilized via the user interface presented in the one or more browser tabs of the workspace shell. The workspace management document is hosted on a shared network resource that may be read by another collaborative content browser (e.g., by another workspace member) such as described herein to render a workspace shell on another user machine having the structural features and populated with links to network resources (e.g., project resources), browsing and search histories, and bookmarks previously curated within the context of the collaborative browser workspace. In some embodiments, the method 600 may further include saving user workspace preference data comprising a network address for the workspace management document. This workspace preference data may be used for re-opening the collaborative browser workspace in the future and/or inviting other users to join the collaborative browser workspace, as further discussed with respect to FIGS. 7 and 8 below and elsewhere herein.

Figure 7:
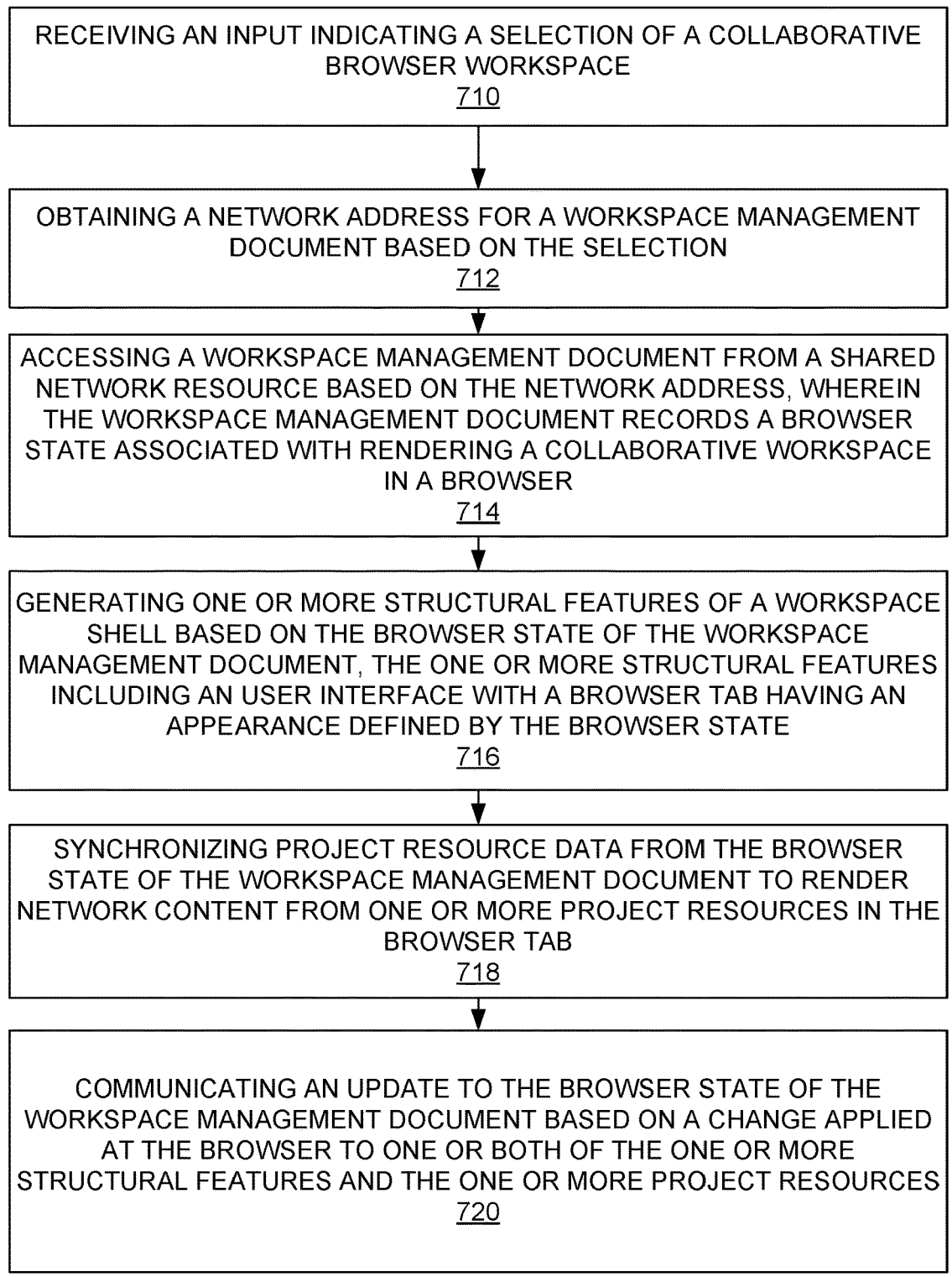
FIG. 7 is a flow diagram showing an example method for accessing a collaborative browser workspace suitable for implementations of the present disclosure.

Referring to FIG. 7, FIG. 7 is a flow chart illustrating a method 700 for accessing from a collaborative content browser a previously established collaborative browser workspace according to some embodiments. The method 700 includes at 710 receiving an input indicating a selection of a collaborative browser workspace and at 712 obtaining a network address for a workspace management document based on the selection. In some embodiments, to generate an instance of the user selected collaborative browser workspace, a workspace manager of the collaborative content browser accesses user workspace preference data, which may comprise the network address (e.g., a URL) for a server hosting the workspace management document. In some embodiments, the network address for the workspace management document may itself be retrieved from a network resource such as a server or data source. At 714, the method 700 includes accessing a workspace management document from a shared network resource based on the network address, wherein the workspace management document records a browser state associated with rendering a collaborative workspace in a browser. The browser state of the workspace management document is a representation of browser data structures for a specific collaborative browser workspace, stored in a cloud document. The browser state maintains the data and metadata for defining the browser object from which the browser process renders the collaborative browser workspace in a workspace shell generated by the collaborative workspace browser. As previously shown in FIG. 3, the workspace management document 108 and browser state 305 may comprises workspace structure data, workspace member presence data, and workspace network content metadata.

At 716, the method 700 includes generating one or more structural features of a workspace shell based on the browser state of the workspace management document, the one or more structural features including a user interface with a browser tab having an appearance defined by the browser state. In some embodiments, a browser process is executed to generate a workspace shell for the collaborative browser workspace by rendering one or more structural features of the workspace shell based on the browser state, the one or more structural features including at least one browser tab. In some embodiments, the workspace manager spawns a browser object that is used by the process to generate the workspace shell. In some embodiments, the browser object defines a tab strip model and a bookmarks bar model and further includes definitions from the structural feature data of the browser state, such as a workspace name or workspace ID, a color identifier, an indication of the number of browser tabs included in the workspace and their respective names, and/or other information defining the appearance and structural organization of the workspace to be rendered by the browser process. In some embodiments, the browser object further comprises workspace member status data used by the browser process to render member presence indicators.

At 718, the method 700 includes synchronizing project resource data from the browser state of the workspace management document to render network content from one or more project resources in the browser tab. The project resource data comprises network addresses (e.g., URLs) associated with project resources. The project resource content may be hosted on data sources such as, but not limited to, document servers, website servers, email servers, social media servers, cloud based concierge or shopping services, virtual assistants, gaming servers, or queryable databases, for example. Project resources rendered in the at least one browser tab may include, for example, websites, documents, web applications, and other network contents, bookmarks, search histories, and other information relevant to a project.

In some embodiments, the method may further include synchronizing subsequent changes related to the one or more structural features and the project resource data with the workspace management document. As such, the workspace management document may be leveraged to synchronize structure and content of the browsing experience among members of the collaborative workspace. Accordingly, the method proceeds to 720 with communicating an update to the browser state of the workspace management document based on a change applied at the browser to one or both of the one or more structural features and the one or more project resources. In some embodiments, the method synchronizes one or more aspects of the collaborative browser workspace with at least one other collaborative content browser by applying one or more updates to the workspace management document based on changes to one or both of the one or more structural features and the one or more project resources. The resulting workspace management document browser state comprises a representation of the collaborative browser workspace as currently displayed and utilized via the user interface presented in the one or more browser tabs of the workspace shell. Changes made to the workspace management document by workspace members are propagated to the collaborative workspace browsers of other workspace members, thus maintaining a synchronization of the structure and content of the collaborative browser workspace across user devices.

Figure 8:
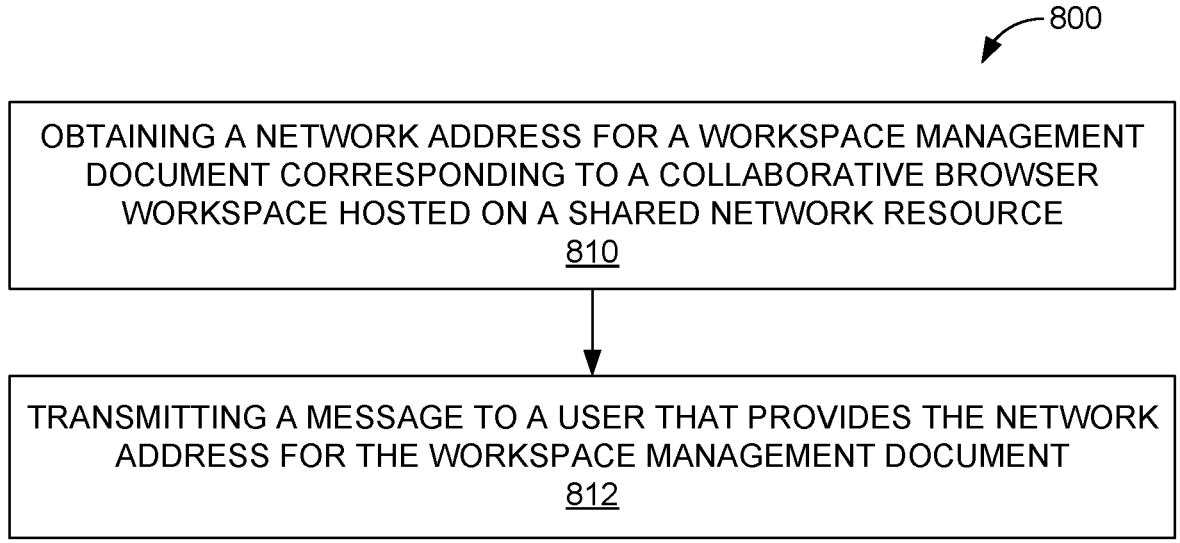
FIG. 8 is a flow diagram showing an example method for inviting users to join a collaborative browser workspace as workspace members, suitable for implementations of the present disclosure.

Referring to FIG. 8, FIG. 8 is a flow chart illustrating a method 800 for sharing a collaborative browser workspace according to some embodiments. The method 800 includes at 810 obtaining a network address (e.g., a URL) for a workspace management document hosted on a shared network resource, the workspace management document corresponding to a collaborative browser workspace. In some embodiments, obtaining the network address may comprise reading user-workspace preference data based on a selection of the collaborative browser workspace a workspace member wants to share. In some embodiments, user-workspace preference data comprising the network address may be retrieved from a network resource such as a server 106 or data source 107. At 812, the method 800 includes transmitting a message via a network to a user that provides the network address for the workspace management document 108. Once the invited user receives the network address for the workspace management document they can open the workspace management document from their collaborative content browser to render the collaborative browser workspace in the same manner as described with respect to FIG. 7.

Figure 9:
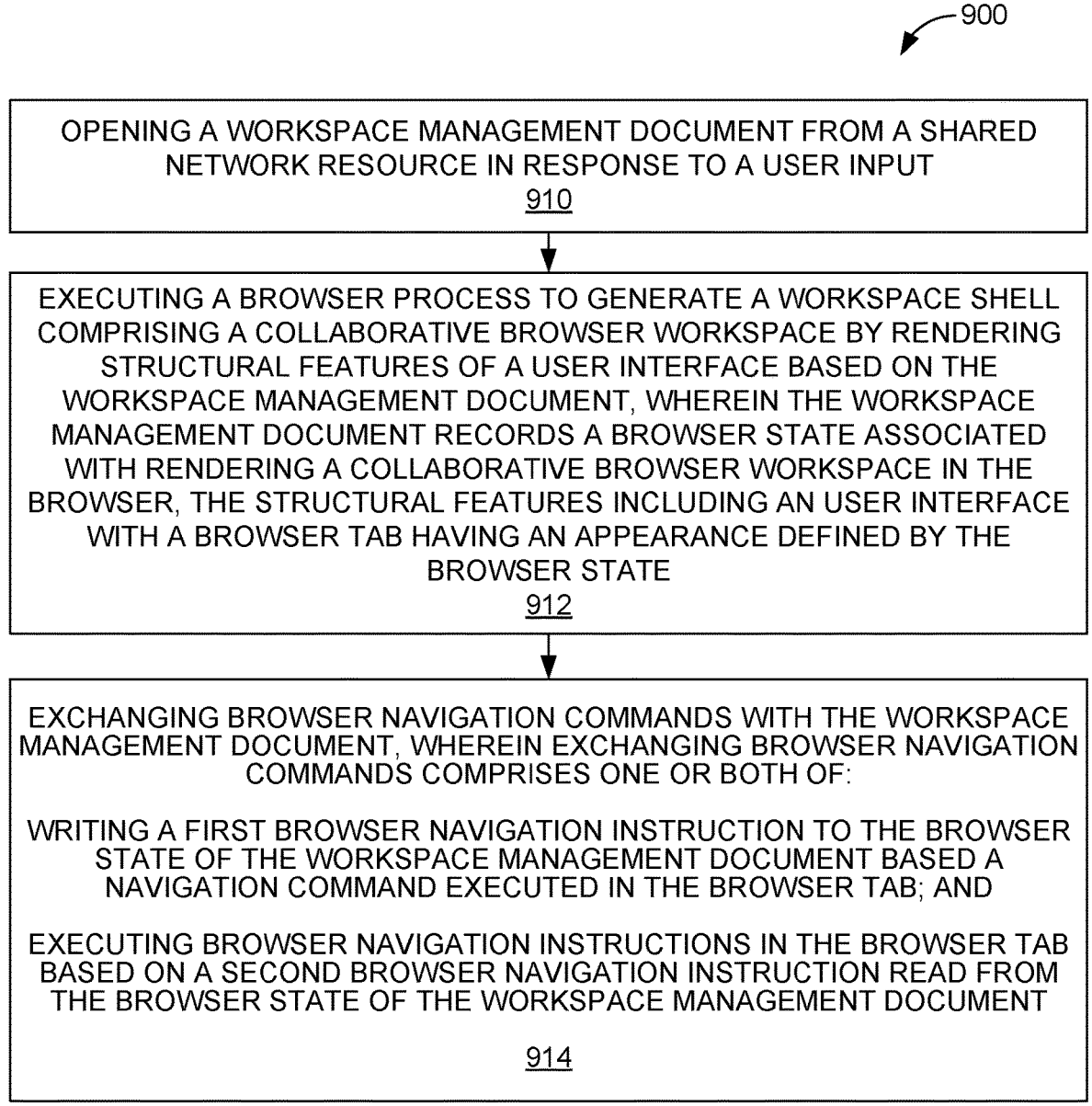
FIG. 9 is a flow diagram showing an example method for collaborative navigation between workspace members of a collaborative browser workspace, suitable for implementations of the present disclosure.

Referring to FIG. 9, FIG. 9 is a flow chart illustrating a method 900 for collaborative navigation using a collaborative browser workspace according to some embodiments. The method 900 includes at 910 opening a workspace management document from a shared network resource, the workspace management document corresponding to a collaborative browser workspace. The method 900 at 912 includes executing a browser process to generate a workspace shell comprising a collaborative browser workspace by rendering structural features of a user interface based on the workspace management document, wherein the workspace management document records a browser state associated with rendering a collaborative browser workspace in the browser, the structural features including a user interface with a browser tab having an appearance defined by the browser state. The method 900 at 914 includes exchanging browser navigation commands with the workspace management document. In some embodiments, exchanging browser navigation commands comprises one or both of: writing a first browser navigation instruction to the browser state of the workspace management document based on a navigation command executed in the browser tab, and executing browser navigation instructions in the browser tab based on a second browser navigation instruction read from the browser state of the workspace management document.

In some embodiments, browser navigation instructions synchronized to the workspace management document comprise mapping links—an abstraction or other representation of a URL for directing a browser to a network resource. Mapping links may be shared as browser navigation instructions to the workspace management document in place of a URL actually used by a workspace member to navigate to a resource. In some embodiments, the workspace manager may identify when a URL comprises a non-sharable link (e.g., a link personalized to a specific user that will not work for other users, such as a link comprising an encrypted access token), and generates a sharing link that may be used by others to facilitate reaching the desired network resource. For example, the sharing link may direct a user to a web page (e.g., a sign-in screen) from which a personalized link with encrypted access token can be obtained to reach the desired network resource. In other embodiments, a mapping link shared via the browser navigation instructions may direct a user to a file on a network share drive from which a sharing link may be redeemed. In some embodiments, the method 900 optionally includes executing a state machine or other rules based algorithm that determines which browser navigation instructions are synchronized to the workspace management document 108, and which are not. For example the workspace manager 220 may determine when the result of a navigation command (or an automatic navigation re-direct initiated by a website) has directed a browser tab to an administrative web page (such as a sign-in page, a splash page, or an error page, for example) and block propagation of browser navigation instructions to such pages to the workspace management document. In some embodiments, the method may further comprise displaying one or more member presence indicators based on workspace member status data from the workspace management document. The member presence indicators may display information regarding workspace members currently engaged in the collaborative browser workspace and/or indicating the browser tab of the collaborative browser workspace that workspace members currently have open.

Exemplary Operating Environment

Referring to the drawings in general, and initially to FIG. 10 in particular, an exemplary operating environment implementing aspects of the technology described herein is shown and designated generally as computing device 1000. In some embodiments, one or more of the user devices 102*a* and 102*b* through 102*n* comprise a computing device 1000 as shown in FIG. Computing device 1000 is but one example of a suitable computing environment to implement a user device comprising a collaborative content browser 104, and is not intended to suggest any limitation as to the scope of use of the technology described herein. Neither should the computing device 1000 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, or similar computing devices. Aspects of the technology described herein may also be practiced in distributed computing environments where tasks are performed by remote-processing devices that are linked through a communications network.

With continued reference to FIG. 10, computing device 1000 includes a bus 1010 that directly or indirectly couples the following devices: memory 1012, one or more processors 1014, one or more presentation components 1016, input/output (I/O) ports 1018, I/O components 1022, and an illustrative power supply 1022. Bus 1010 represents what may be one or more busses (such as an address bus, data bus, or a combination thereof). Although the various blocks of FIG. 10 are shown with lines for the sake of clarity, in reality, their respective functions may be distributed across the various components. For example, one may consider a presentation component such as a display device to be an I/O component. Also, processors have memory. The inventors hereof recognize that such is the nature of the art and reiterate that the diagram of FIG. is merely illustrative of an exemplary computing device that may be used in connection with one or more aspects of the technology described herein. Distinction is not made between such categories as "workstation," "server," "laptop," "handheld device," "smart phone," "tablet computer" or similar terms, as all are contemplated within the scope of FIG. 10 and refer to "computer" or "computing device."

Computing device 1000 typically includes a variety of computer-readable media. Computer-readable media may be any available media that may be accessed by computing device 1000 and includes both volatile and nonvolatile, removable and non-removable media. By way of example, and not limitation, computer-readable media may comprise computer storage media and communication media. Computer storage media includes both volatile and nonvolatile, removable and non-removable media implemented in any non-transient method or technology for storage of information such as computer-readable instructions, data structures, program modules, or other data.

Computer storage media includes RAM, ROM, EEPROM, flash memory or other non-transient memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Among other components, computing device 1000 includes a hardware layer that comprises one or more central processing units (CPUs), a memory, and storage. Memory 1012 includes computer storage media in the form of volatile and/or nonvolatile memory. The memory 1012 may be removable, non-removable, or a combination thereof. Exemplary memory includes solid-state memory, hard drives, optical-disc drives, or similar hardware devices. Computing device 1000 includes one or more processors 1014 that read data from various entities such as bus 1010, memory 1012, or I/O components 1022. Presentation component(s) 1016 present data indications to a user or other device. The presentation component(s) 1016 may comprise any form of computing device display, touch screen, and/or augmented reality or virtual reality device. Exemplary presentation components 1016 include, but are not limited to, a display device, speaker, printing component, vibrating component, or similar audio output device. In some embodiments, the presentation components 1016 comprises at least one HMI 251. I/O ports 1018 allow computing device 1000 to be logically coupled to other devices, including I/O components 1022, some of which may be built in. In some embodiments, the I/O ports 1018 include at least one NIC 264.

Illustrative I/O components include a microphone, joystick, game pad, satellite dish, scanner, printer, display device, wireless device, a controller (such as a stylus, a keyboard, touch screen, touch pad, track ball, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1014 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein. In various different embodiments, any of such I/O components may be included in a user device.

An NUI processes air gestures, voice, or other physiological inputs generated by a user. Appropriate NUI inputs may be interpreted as ink strokes for presentation in association with the computing device 1000. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

A computing device may include a radio 1024. The radio 1024 transmits and receives radio communications. The computing device may be a wireless terminal adapted to receive communications and media over various wireless networks, for some embodiments network 110. Computing device 1000 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. A system comprising:
one or more processors coupled to a memory, the one or more processors to perform operations comprising:
storing as a shared network resource a workspace management document, wherein the workspace management document records a browser state associated with rendering a collaborative browser workspace in a content browser;
receiving a first browser state information from a first collaborative content browser on a first device;
receiving a second browser state information from a second collaborative content browser on a second device;
updating the collaborative browser workspace by making changes to the browser state in the workspace management document in response to the first browser state information and the second browser state information;
sending browser state information to the first collaborative content browser, wherein the browser state information describes one or more structural features of a workspace shell based on the browser state of the workspace management document; and
sending the browser state information to the second collaborative content browser, wherein the one or more structural features include a user interface with a browser tab having an appearance defined by the browser state and a bookmark bar with resources associated with the collaborative browser workspace associated with the browser tab, and to render network content from a project resource in the browser tab.

2. The system of claim 1, the operations further comprising:
applying an update to the browser state of the workspace management document based on a change applied to one or both of the one or more structural features and the project resource by one or both of the first collaborative content browser and the second collaborative content browser.

3. The system of claim 1, wherein sending information to the first collaborative content browser and the second collaborative content browser that generates one or more structural features of a workspace shell further comprises:
sending information that renders in the workspace shell a workspace identification indicator corresponding to the collaborative browser workspace, the workspace identification indicator selected from a group consisting of a workspace name, a workspace identification and a color identifier.

4. The system of claim 1, wherein sending information to the first collaborative content browser and the second collaborative content browser to generate one or more structural features of a workspace shell further comprises:
sending information that renders a member presence indicator in the workspace shell identifying a current user of the collaborative browser workspace based on a browsing state.

5. A method comprising:
storing as a shared network resource a workspace management document, wherein the workspace management document records a browser state associated with rendering a collaborative browser workspace in a content browser;
receiving a first browser state information from a first collaborative content browser on a first device;
receiving a second browser state information from a second collaborative content browser on a second device;
updating the collaborative browser workspace by making changes to the browser state in the workspace management document in response to the first browser state information and the second browser state information;
sending browser state information to the first collaborative content browser, wherein the browser state information describes one or more structural features of a workspace shell based on the browser state of the workspace management document; and
sending the browser state information to the second collaborative content browser, wherein the one or more structural features include a user interface with a browser tab having an appearance defined by the browser state and a bookmark bar with resources associated with the collaborative browser workspace associated with the browser tab, and to render network content from a project resource in the browser tab.

6. The method of claim 5, further comprising:
applying an update to the browser state of the workspace management document based on a change applied to one or both of the one or more structural features and the project resource by one or both of the first collaborative content browser and the second collaborative content browser.

7. The method of claim 5, wherein sending information to the first collaborative content browser and the second collaborative content browser that generates one or more structural features of a workspace shell further comprises:
sending information that renders in the workspace shell a workspace identification indicator corresponding to the collaborative browser workspace, the workspace identification indicator selected from a group consisting of a workspace name, a workspace identification and a color identifier.

8. The method of claim 5, wherein sending information to the first collaborative content browser and the second collaborative content browser to generate one or more structural features of a workspace shell further comprises:
sending information that renders a member presence indicator in the workspace shell identifying a current user of the collaborative browser workspace based on a browsing state.

9. One more computer-storage media having computer-executable instructions embodied thereon that when executed by a computing system causes the computing system to perform a method comprising:
storing as a shared network resource a workspace management document, wherein the workspace management document records a browser state associated with rendering a collaborative browser workspace in a content browser;

receiving a first browser state information from a first collaborative content browser on a first device;

receiving a second browser state information from a second collaborative content browser on a second device;

updating the collaborative browser workspace by making changes to the browser state in the workspace management document in response to the first browser state information and the second browser state information;

sending browser state information to the first collaborative content browser, wherein the browser state information describes one or more structural features of a workspace shell based on the browser state of the workspace management document; and sending the browser state information to the second collaborative content browser, wherein the one or more structural features include a user interface with a browser tab having an appearance defined by the browser state and a bookmark bar with resources associated with the collaborative browser workspace associated with the browser tab, and to render network content from a project resource in the browser tab.

10. The media of claim 9, further comprising:

applying an update to the browser state of the workspace management document based on a change applied to one or both of the one or more structural features and the project resource by one or both of the first collaborative content browser and the second collaborative content browser.

11. The media of claim 9, wherein sending information to the first collaborative content browser and the second collaborative content browser that generates one or more structural features of a workspace shell further comprises:

sending information that renders in the workspace shell a workspace identification indicator corresponding to the collaborative browser workspace, the workspace identification indicator selected from a group consisting of a workspace name, a workspace identification and a color identifier.

12. The media of claim 9, wherein sending information to the first collaborative content browser and the second collaborative content browser to generate one or more structural features of a workspace shell further comprises:

sending information that renders a member presence indicator in the workspace shell identifying a current user of the collaborative browser workspace based on a browsing state.

\* \* \* \* \*